United States Patent
Ruse et al.

(10) Patent No.: US 7,314,285 B2
(45) Date of Patent: Jan. 1, 2008

(54) VEHICLE MIRROR SYSTEM WITH REDUCED FRICTION ACTUATION AND MOVEMENT

(75) Inventors: James A. Ruse, Allegan, MI (US); Kris D. Brown, Lake Odessa, MI (US)

(73) Assignee: Magna Donnelly Mirrors North America L.L.C., Kentwood, MI (US)

( * ) Notice: Subject to any disclaimer, the term of this patent is extended or adjusted under 35 U.S.C. 154(b) by 0 days.

(21) Appl. No.: 11/467,750

(22) Filed: Aug. 28, 2006

(65) Prior Publication Data

US 2006/0285254 A1    Dec. 21, 2006

Related U.S. Application Data

(63) Continuation of application No. 11/162,556, filed on Sep. 14, 2005.

(60) Provisional application No. 60/522,312, filed on Sep. 14, 2004.

(51) Int. Cl.
*G02B 5/08* (2006.01)

(52) U.S. Cl. .................. 359/841; 359/872; 248/479

(58) Field of Classification Search ........... 359/841, 359/872, 875, 877, 881; 248/479, 481
See application file for complete search history.

(56) References Cited

U.S. PATENT DOCUMENTS

| | | | |
|---|---|---|---|
| 2,856,816 A | 10/1958 | Ross | |
| 2,903,210 A | 9/1959 | Cousins | |
| 3,189,309 A | 6/1965 | Hager | |
| 3,282,549 A | 11/1966 | Crawford | |
| 3,667,718 A | 6/1972 | Goslin et al. | |
| 4,165,156 A | 8/1979 | O'Connell | |
| 4,258,894 A | 3/1981 | Niggemann | |
| 4,315,614 A | 2/1982 | Stegenga et al. | |
| 4,558,930 A | 12/1985 | Deedreek | |
| 4,598,982 A | 7/1986 | Levine | |
| 4,605,289 A | 8/1986 | Levine et al. | |
| 4,711,538 A | 12/1987 | Ohs et al. | |
| 4,753,410 A | 6/1988 | Dyer | |
| 4,892,400 A | 1/1990 | Brookes et al. | |
| 4,892,401 A | 1/1990 | Kittridge et al. | |
| 4,921,337 A | 5/1990 | Hou | |
| 5,007,724 A | 4/1991 | Hou | |
| 5,096,283 A | 3/1992 | Croteau | |
| 5,110,196 A | 5/1992 | Lang et al. | |
| 5,124,847 A | 6/1992 | Gong | |
| 5,210,655 A | 5/1993 | Mishali | |
| 5,225,943 A | 7/1993 | Lupo | |
| 5,337,190 A | 8/1994 | Kogita et al. | |
| 5,375,014 A | 12/1994 | Fujie et al. | |
| 5,546,239 A | 8/1996 | Lewis | |
| 5,604,644 A | 2/1997 | Lang et al. | |

(Continued)

*Primary Examiner*—Alessandro Amari
(74) *Attorney, Agent, or Firm*—McGarry Bair PC

(57) ABSTRACT

A vehicular external rearview mirror system comprises a support arm pivotally connected to a base assembly attached to the vehicle. The pivot connection comprises an assembly of rotating plates separated by ball bearings and operated by a powerfold assembly. During normal operation of the mirror system, the ball bearings remained seated in bearing seats to enable the plates to rotate as a single unit when the powerfold assembly is actuated. However, manual folding or unfolding of the mirror system urges the ball bearings out of their bearing seats to travel along a raceway in one of the plates to facilitate the rotation of the plates relative to each other.

10 Claims, 39 Drawing Sheets

U.S. PATENT DOCUMENTS

| | | |
|---|---|---|
| 5,969,890 A | 10/1999 | Whitehead |
| 6,024,459 A | 2/2000 | Lewis |
| 6,439,730 B1 | 8/2002 | Foote et al. |
| 6,505,944 B1 | 1/2003 | Lewis |
| 6,598,983 B1 * | 7/2003 | Boddy ................. 359/841 |
| 6,648,481 B2 | 11/2003 | Lewis |
| 6,742,756 B1 * | 6/2004 | Fimeri et al. ............ 248/479 |
| 6,820,987 B1 | 11/2004 | Lewis |
| 6,926,414 B2 * | 8/2005 | Van Stiphout ............ 359/841 |
| 2004/0165295 A1 | 8/2004 | Lewis |
| 2005/0030652 A1 | 2/2005 | Lewis |

* cited by examiner

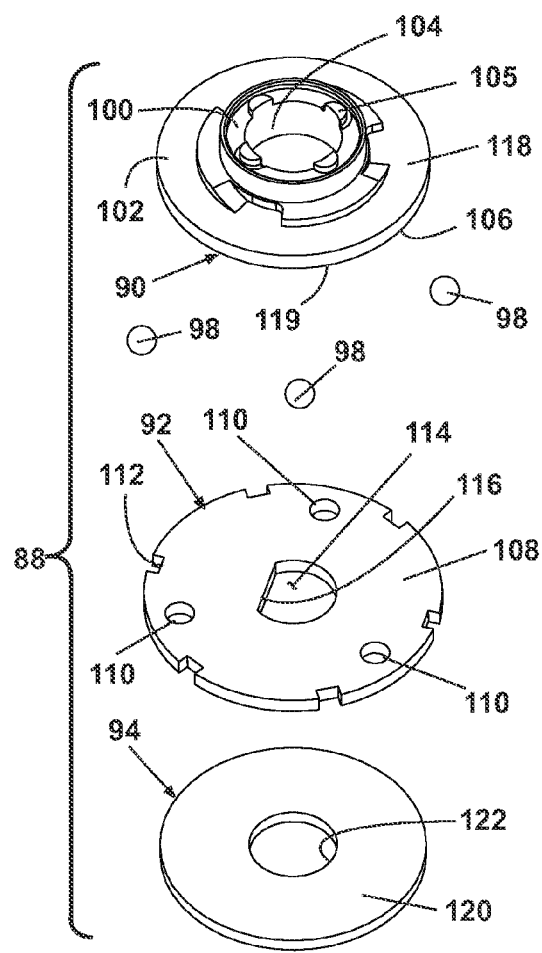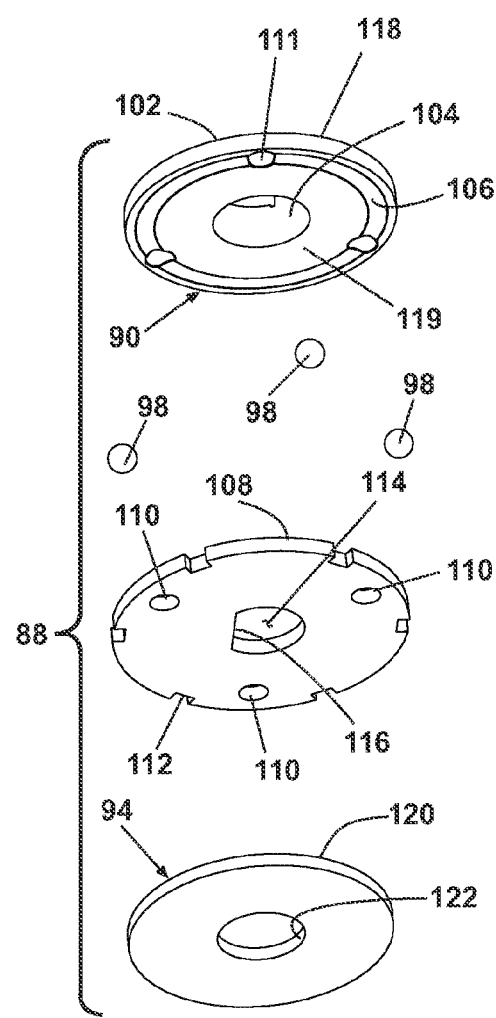
Fig. 10
Fig. 11

VEHICLE MIRROR SYSTEM WITH REDUCED FRICTION ACTUATION AND MOVEMENT

CROSS-REFERENCE TO RELATED APPLICATION

This application is a continuation of U.S. application Ser. No. 11/162,556, filed Sep. 14, 2005, and claims the benefit of U.S. Provisional Application Ser. No. 60/522,312, filed Sep. 14, 2004, which are incorporated herein in their entirety.

BACKGROUND OF THE INVENTION

1. Field of the Invention

The invention relates generally to a rearview mirror assembly for a motor vehicle and more particularly to a rearview mirror assembly having a reduced friction power-fold assembly.

2. Description of the Related Art

Motor vehicles typically include at least one external rearview mirror system for providing the operator with a rearward view. The mirror system typically comprises a base attached to the motor vehicle, a reflective element assembly comprising a mirror and a supporting bracket, and an arm assembly interconnecting the reflective element assembly and the base. With large mirrors, such as those found on trucks, the arm assembly will frequently comprise a twin-arm assembly. The reflective element assembly can be adapted for selective unfolding away from, or folding against, the vehicle to position the mirror system in order to minimize the potential for impact when the mirror is not needed, for example when the vehicle is moving through a car wash. This is accomplished by a pivot connection interposed between the base and the arm assembly. The unfolding and folding can be accomplished manually by pushing or pulling the reflective element assembly to pivot the arm assembly relative to the base, or by a remotely controlled, motorized power-fold mechanism incorporated into the pivot connection and adapted for rotation of the arm assembly.

In a motorized power-fold mechanism incorporated into the mirror system, there are advantages to having the mirror system capable of manual folding and unfolding. The operational components (e.g. the motor and transmission assembly) providing the power-fold functionality will typically be resistant to manual movement due to folding and unfolding. There may be occasions when it is desirable to manually fold or unfold the mirror system, such as after the vehicle has been turned off. During operation, or when the vehicle is unattended, such as in a public parking facility, the mirror system can be struck, and forced against the vehicle. This can cause damage to the structural and operational components. Thus, mirror systems with a power-fold assembly will typically incorporate a detent assembly into the pivot assembly.

The detent assembly can comprise opposed contacting bodies which move as a unit under the influence of interconnecting detents during normal power-fold operation, but which will rotate relative to each other in response to impact to or manual movement of the mirror system. The requirement that the pivot assembly be tightly configured in order to minimize undesirable vibration of the mirror system will generally necessitate a significant normal force urging the contacting bodies together. The relative rotation of the contacting bodies can thus involve the development of significant frictional forces as the detents move out of their "at-rest" positions and travel along the opposing contacting body, even though the detent assembly may be fabricated of low-friction materials. These frictional forces can also contribute to wear of the contacting bodies, which will also contribute to vibration and improper operation. Thus, there is a need for a pivot assembly which is coherent and not susceptible to vibration, enables the powered folding and unfolding of the arm assembly relative to the base, and enables the mirror system to be easily manually folded and unfolded.

SUMMARY OF THE INVENTION

A mirror assembly for use on a motor vehicle comprises a reflective element assembly for providing an external rearward reflective view to an operator of the motor vehicle, a base adapted to be mounted to the vehicle, a support arm assembly having a first end and a second end, the first end being movably attached to the base between a folded position and an unfolded position, the second end being mounted to the reflective element assembly, a reduced-friction detent assembly interposed between the first end of the support arm assembly and the base, wherein the reduced-friction detent assembly comprises at least one bearing selectively mounted in an engaged position and a disengaged position, wherein the support arm assembly moves between the folded and unfolded positions in the disengaged position with less friction than when the at least one bearing is in the engaged position.

BRIEF DESCRIPTION OF THE DRAWINGS

In the drawings:

FIG. 10 is a first exploded view of a portion of the reduced friction pivot assembly illustrated in FIG. 2.

FIG. 11 is a second exploded view of a portion of the reduced friction pivot assembly illustrated in FIG. 2.

DESCRIPTION OF EMBODIMENTS OF THE INVENTION

Figure 1:
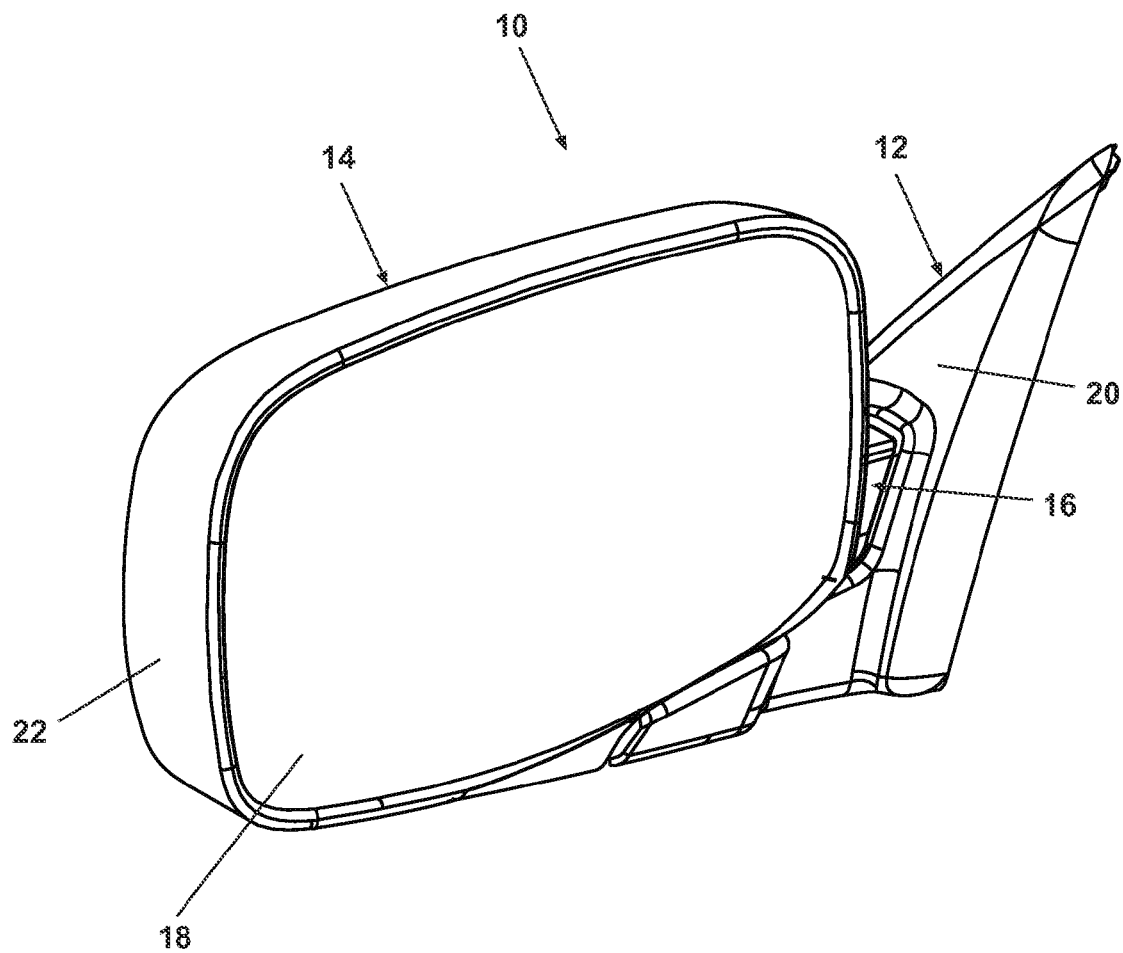
FIG. 1 is a perspective view of a first embodiment of a vehicle rearview mirror system according to the invention.

Referring to the Figures, and in particular to FIG. 1, a first embodiment of a vehicle mirror system 10 according to the invention is adapted for attachment to the exterior of a motor vehicle (not shown) in a well-known manner. The vehicle mirror system 10 comprises a base assembly 12 adapted for fixed mounting to the motor vehicle, pivotally connected to a reflective element assembly 14 through a pivot connection 16 for providing the operator of the motor vehicle with an adjustable reflective rearward view.

The reflective element assembly 14 can share one or more elements of a well-known vehicle rearview mirror assembly, including a tilt actuator, a bezel, a reflective element carrier, and a reflective element 18, which are generally well-known and will not be further described herein. The base assembly 12 comprises a base assembly shell 20 enclosing a base frame assembly 26, and the reflective element assembly 14 comprises a reflective element assembly shell 22 enclosing a support frame assembly 24 for supporting the tilt actuator, reflective element carrier, reflective element 18, and the like.

Figure 2:
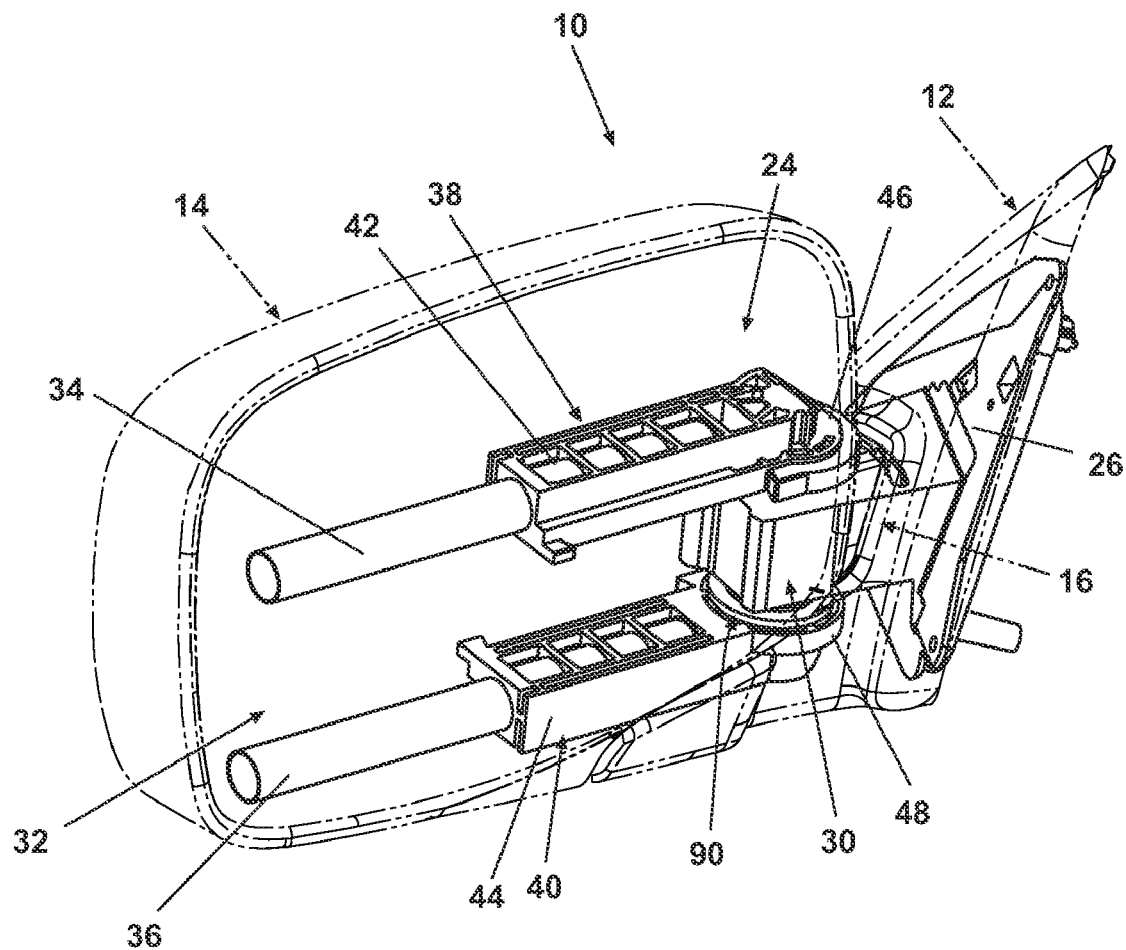
FIG. 2 is a front perspective view of the rearview mirror system of FIG. 1, illustrating the internal components.
Figure 3:
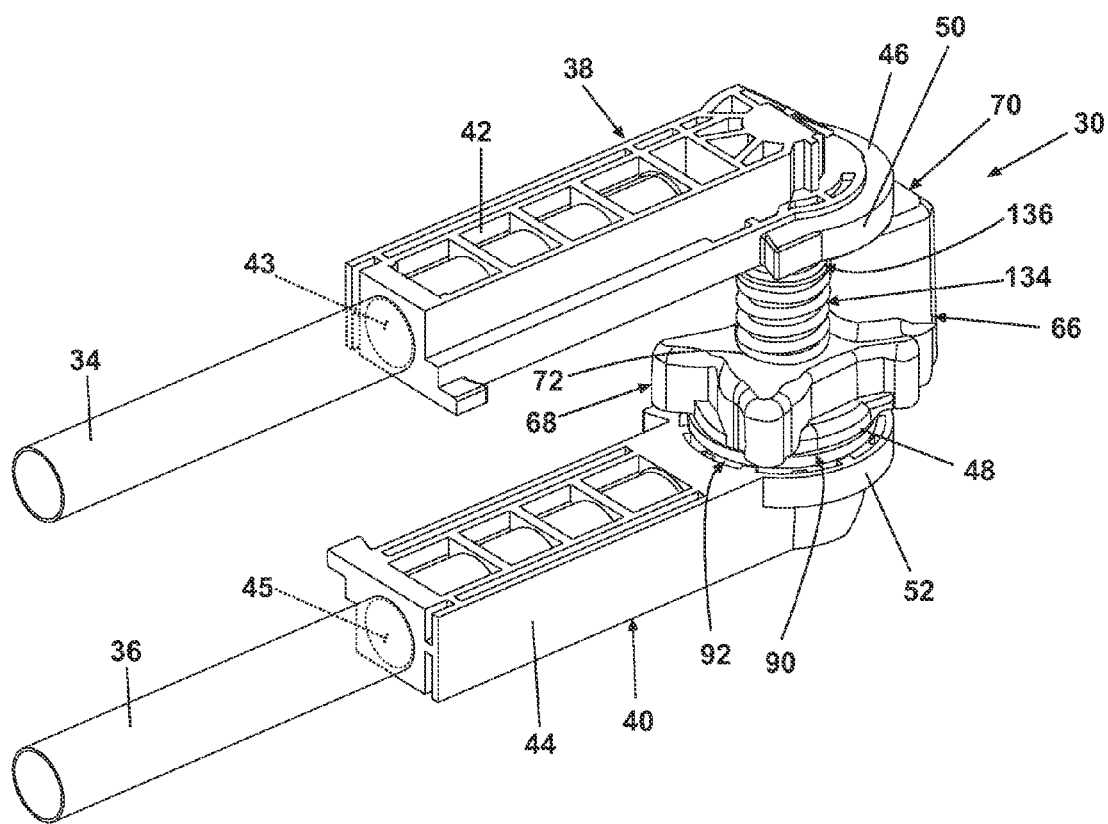
FIG. 3 is a first enlarged perspective view of a reduced friction pivot assembly illustrated in FIG. 2, incorporating a powerfold assembly.
Figure 4:
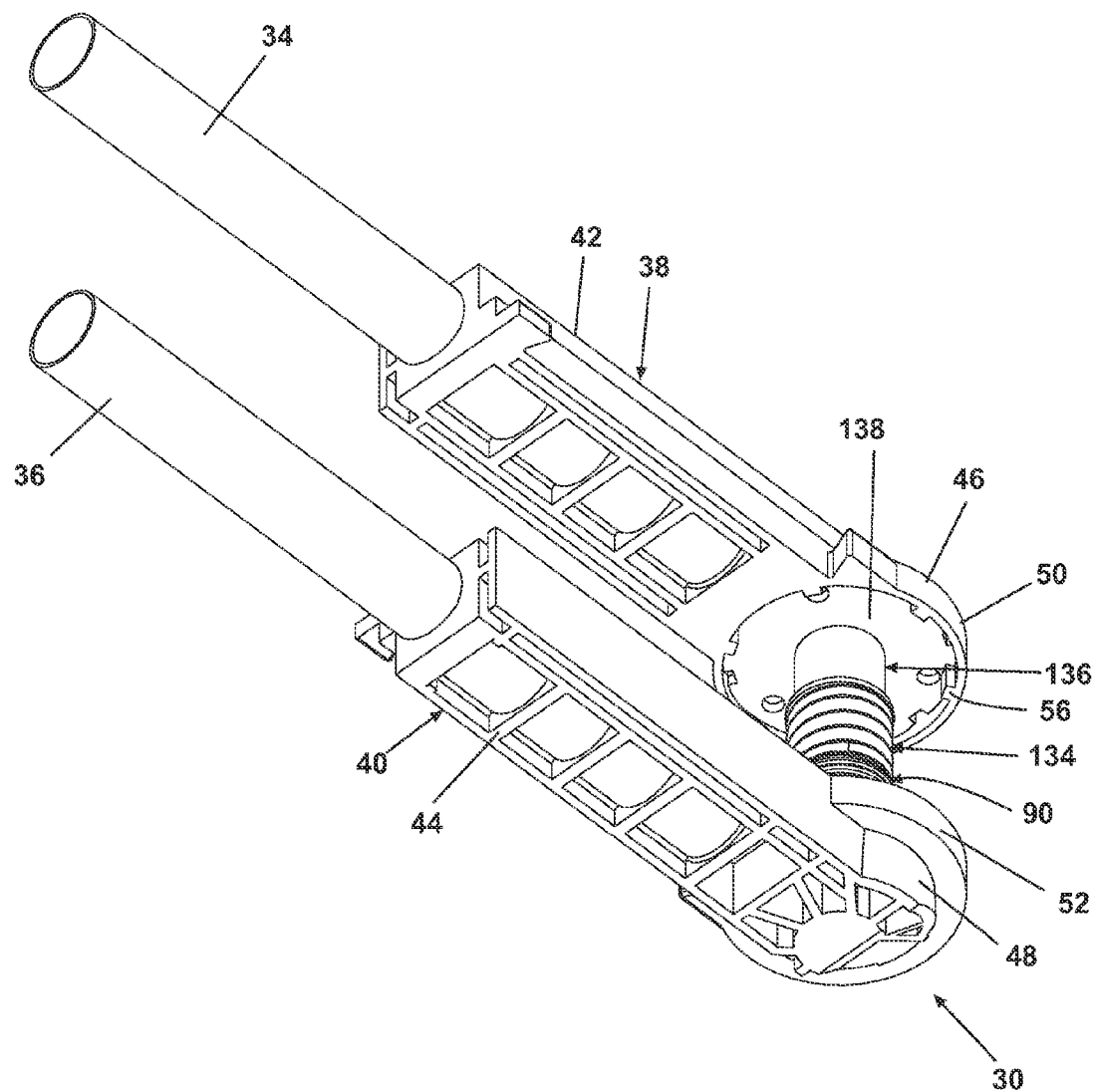
FIG. 4 is a second enlarged perspective view of the reduced friction pivot assembly illustrated in FIG. 2, with the powerfold assembly removed for clarity.

As illustrated in FIG. 2, the support frame assembly 24 comprises a generally well-known dual-arm tube assembly 32 comprising an upper tube 34 and a lower tube 36 in parallel, spaced-apart juxtaposition. Preferably, the tube assembly 32 comprises a light-weight steel or aluminum tubing having a sufficient size and strength for the purposes described herein. It should be understood that the support frame assembly 24 is shown as a dual-arm tube assembly for illustrative purposes only. The invention can comprise other support arm assemblies, and should not be construed as limited to a dual-arm tube assembly.

The tube assembly 32 is pivotably attached to the base assembly 12 through a reduced-friction pivot assembly 30 adapted for selective folding of the mirror system 10 against the vehicle and unfolding of the mirror system 10 away from the vehicle, as hereinafter described. The folding/unfolding operation can be manually controlled or controlled by a motorized powerfold assembly (not shown) as generally illustrated and described in U.S. Pat. No. 6,439,730 to Foote et al.

Referring now to FIGS. 3-6, the reduced-friction pivot assembly 30 comprises an upper pivot arm 38 and a lower pivot arm 40. As illustrated in the Figures, the upper pivot arm 38 and the lower pivot arm 40 are identical in every respect. With specific reference to FIG. 6, the upper pivot arm 38 is an elongated body comprising an upper tube sleeve 42 transitioning at a first end to an upper cap 46. The upper tube sleeve 42 is provided with a tube channel 43 extending longitudinally therethrough and adapted for receipt of the upper tube 34 therein. The upper tube 34 is fixedly retained in the tube channel 43 in a suitable manner, such as by a friction or interference fit, setscrew-like fasteners, adhesives, or the like. The upper cap 46 is a generally circular extension of the upper tube sleeve 42 and comprises an upper circumferential wall 50 extending orthogonally away from a cap floor 55. The upper tube sleeve 42 extends radially away from the upper cap 46.

The lower pivot arm 40 is an elongated body comprising a lower tube sleeve 44 transitioning at a first end to a lower cap 48. The lower tube sleeve 44 is provided with a tube channel 45 extending longitudinally therethrough and adapted for receipt of the lower tube 36 therein. The lower tube 36 is fixedly retained in the tube channel 45 in a suitable manner, such as by a friction or interference fit, setscrew-like fasteners, adhesives, or the like. The lower cap 48 is a generally circular extension of the lower tube sleeve 44 and comprises a lower circumferential wall 52 extending orthogonally away from a cap floor 57. The lower tube sleeve 44 extends radially away from the lower cap 48.

The circumferential wall 50, 52 and the cap floor 55, 57 define a circular receptacle 74. The cap floor 55, 57 transitions to an inset receptacle 54 (FIG. 6) defined by a floor 79, and a circular wall 76 and a rectilinear wall 78 extending orthogonally therefrom. The floor 79 transitions at its center to an arcuate wall 59 and a planar chord wall 61 depending orthogonally from the floor 79 to define a generally D-shaped inset seat 58. A setscrew aperture 60 extends radially through the chord wall 61 into the seat 58 and is adapted for threadable receipt of a setscrew 62. A plurality of evenly-spaced bosses 56 extend radially inwardly into the receptacle 74 from the circumferential walls 50, 52.

Referring again to FIG. 5, a pivot shaft 64 is an elongated, rod-like member having a first end 80 and a second end 82, and a generally circular cross-section. The circular cross-section transitions at the first end 80 to a semicircular cross-section defining a face 84, and at the second end 82 to a semicircular cross-section defining a face 86. The first end 80 is adapted for slidable receipt in the seat 58 of the upper pivot arm 38, and the second end 82 is adapted for slidable receipt in the seat 58 of the lower pivot arm 40.

A powerfold assembly 66 comprises a transmission assembly 68 and a drive motor assembly 70 adapted for slidable engagement with the pivot shaft 64. The transmission assembly 68 is provided with a shaft aperture 72 extending therethrough for slidable receipt of the pivot shaft 64. The powerfold assembly 66 is fixedly attached to the base frame 26 in a suitable well-known manner using brackets, seats, cradles, fasteners, and the like.

Figure 5:
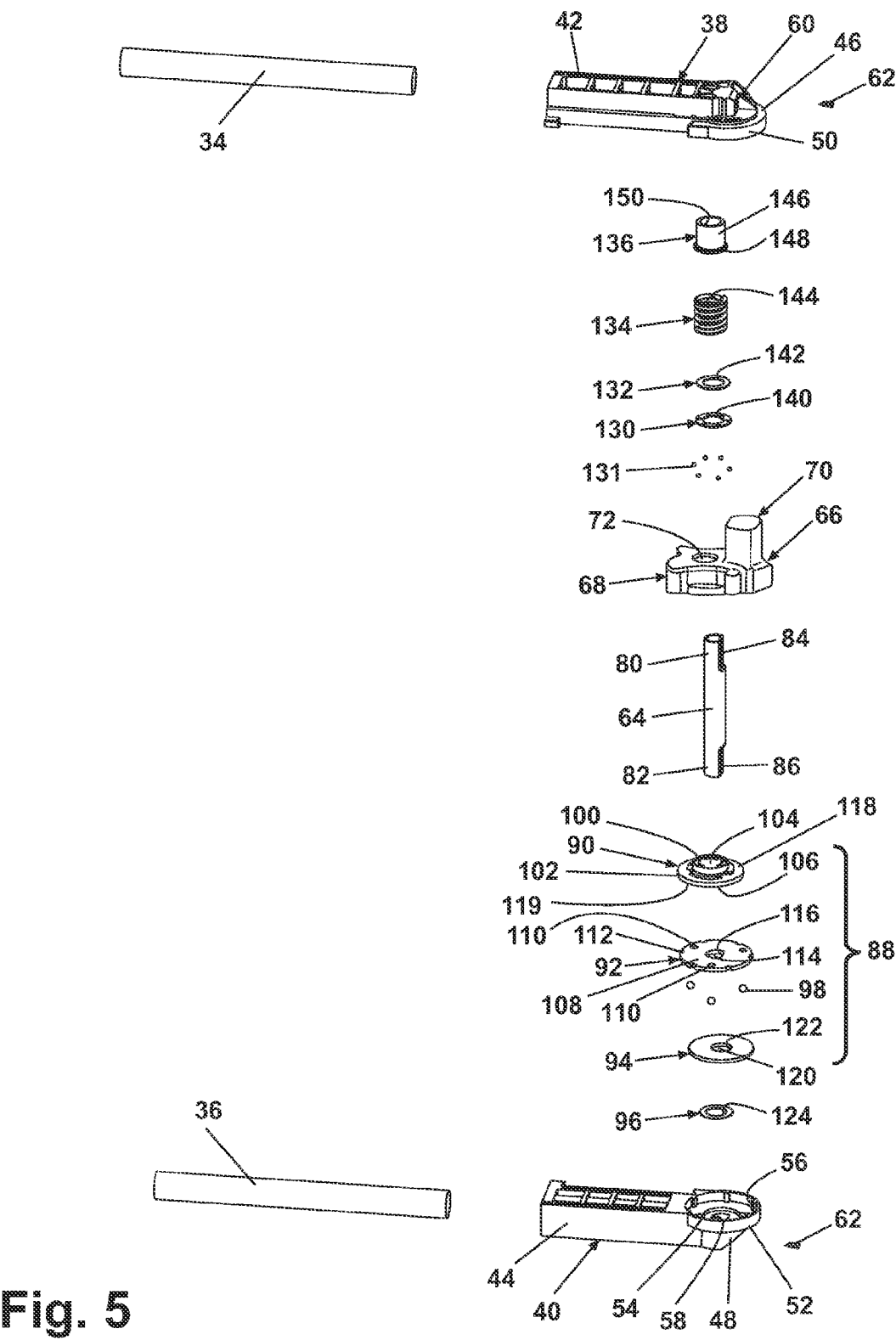
FIG. 5 is an exploded view of the reduced friction pivot assembly illustrated in FIG. 2.
Figure 6:
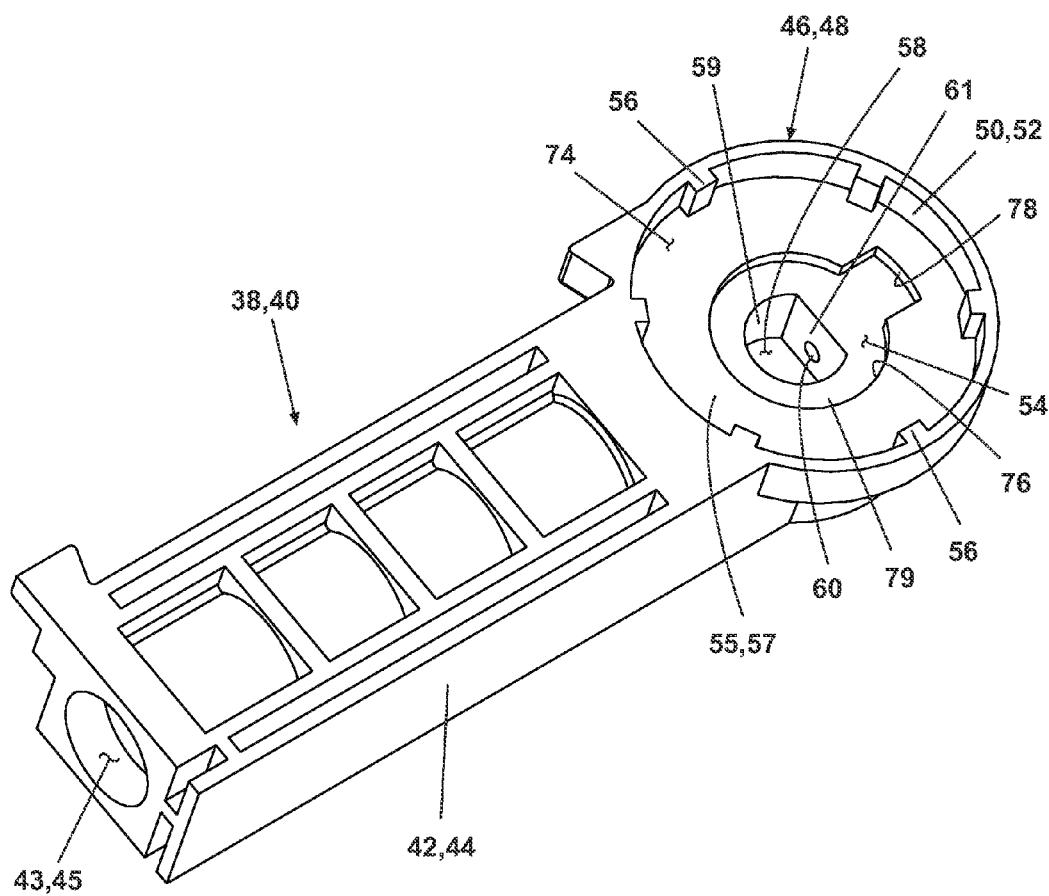
FIG. 6 is an enlarged perspective view of a pivot arm comprising a part of the reduced friction pivot assembly illustrated in FIG. 2.

Referring to FIGS. 5, 10, and 11, the pivot bearing assembly 88 comprises an upper plate 90, a bearing seat plate 92, a lower plate 94, and a plurality of ball bearings 98. The upper plate 90 is a generally plate-like member comprising an annular bearing flange 102 having a circular shaft aperture 104 extending coaxially therethrough and first and second opposed faces 118, 119. An annular drive collet 100 extends orthogonally and coaxially from the first face 118, and comprises a plurality of bosses 105 extending longitudinally therefrom in regularly-spaced juxtaposition. An annular raceway 106 extends along the second face 119 adjacent the circumference of the bearing flange 102. A plurality of ball seats 111 extend at regular spacing along the raceway 106.

The bearing seat plate 92 is a generally plate-like member having a generally D-shaped shaft aperture 114 extending coaxially therethrough. The shaft aperture 114 has a chord edge 116 adapted for slidable engagement with the face 84, 86 of the pivot shaft 64. A plurality of circular ball apertures 110 are spaced equally about the bearing seat plate 92 for cooperative alignment with the ball seats 111 and the raceway 106, and extending therethrough adjacent the circumference for rotational receipt of a plurality of ball bearings 98. The diameter of the ball seats 111 is somewhat greater than the diameter of the ball bearings 98 to enable the ball bearings 98 to rotate freely within the ball seats 111 without excessive lateral translation. A plurality of circumferential notches 112 are spaced equally about the circumference of the bearing seat plate 92 and extend radially inwardly therefrom.

The lower plate 94 is a generally plate-like member comprising an annular flange 120 and a shaft aperture 122 extending coaxially therethrough. The lower plate 94 is adapted for slidable receipt in the receptacle 74 radially inwardly of the bosses 56. The ball bearings 98 are well-known spherical bearings adapted for rotational seating in the ball seats 110. A well-known washer 96 has a circular shaft aperture 124 extending coaxially therethrough, and is adapted for slidable receipt in the receptacle 54. The washer 96 can comprise a "low friction" material, such as Teflon, or can be replaced with a low friction bearing, such as a roller bearing, in order to enable the lower plate 94 to turn within the receptacle 74, as hereinafter described.

An outer bearing washer 130 has a circular shaft aperture extending coaxially therethrough, and a plurality of seats adapted for rotational receipt of well-known spherical bearings 131 therein. An inner bearing washer 132 comprises a well-known washer having a circular shaft aperture extending coaxially therethrough. A helical spring 134 has a circular shaft aperture extending therethrough and a spring constant suitable for the uses described herein. A sleeve 136 comprises an annular sleeve body 146 and an annular flange 148 extending radially outwardly therefrom at a first end of thereof. A shaft aperture 150 extends coaxially therethrough.

Figure 9:
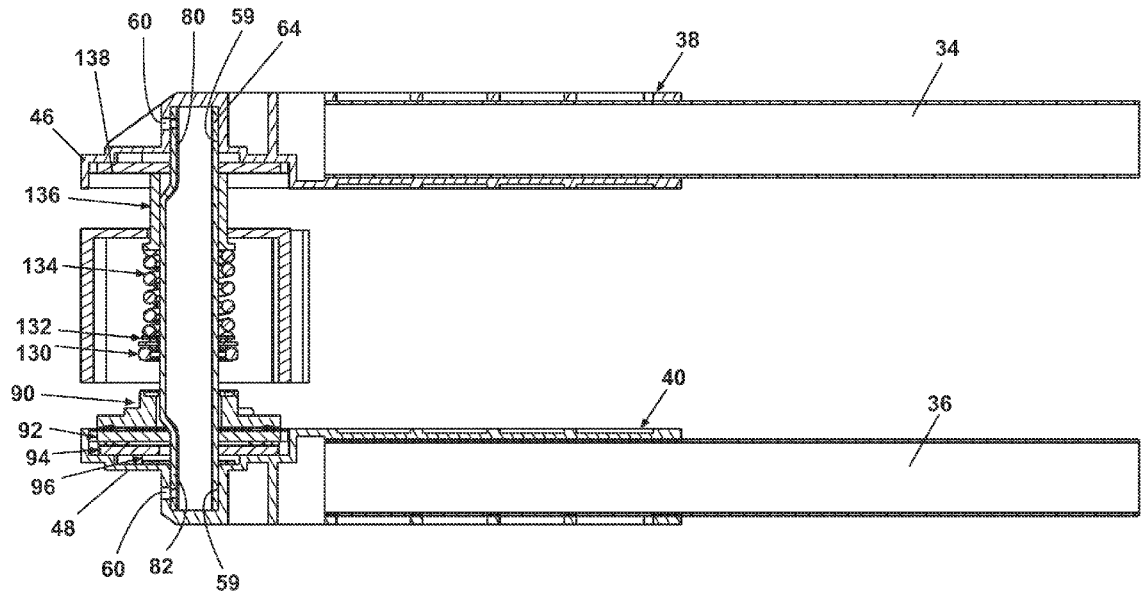
FIG. 9 is a sectional view taken along view line 9-9 of FIG. 8, with the powerfold assembly removed for clarity.

Referring also to FIG. 9, a bearing seat plate 138 is a generally plate-like member essentially identical to the bearing seat plate 92 but without the ball apertures 110, and having a generally D-shaped shaft aperture extending therethrough. A plurality of circumferential notches similar to the notches 112 are spaced equally about the circumference of the bearing seat plate 138 and extend radially inwardly therefrom.

As shown in FIG. 9, the bearing seat plate 138 is inserted into the receptacle 74 so that the circumferential notches engage the bosses 56 and the chord edge 116 is aligned with the chord wall 61 so that the first end 80 of the pivot shaft 64 is slidably received in the seat 58. A setscrew 62 is threadably installed in the setscrew aperture 60 to bear against the face 84 to fixedly retain the pivot shaft 64 to the upper pivot arm 38. The sleeve 136 is slidably inserted over the pivot shaft 64 with the flange 148 away from the bearing seat plate 138. The spring 134, the inner bearing washer 132, and the outer bearing washer 130 are slidably inserted, respectively, over the pivot shaft 64. The powerfold assembly 66 is then installed over the pivot shaft 64 by slidably inserting the pivot shaft 64 through the shaft aperture 72. The outer bearing washer 130 will facilitate relative rotational movement between the powerfold assembly 66 and the upper pivot arm 38.

The upper plate 90 is slidably inserted over the pivot shaft 64 so that the annular drive collet 100 operatively engages the transmission assembly 68. The bearing seat plate 92 with ball bearings 98 installed in the ball apertures 111 is then slidably inserted over the pivot shaft 64, followed by the lower plate 94, the washer 96, and the lower pivot arm 40. The washer 96 is installed in the receptacle 54, and of the lower plate 94 is installed in the receptacle 74. The bearing seat plate 92 is installed in the receptacle 74 so that the circumferential notches 112 engage the bosses 56 and the chord edge 116 is aligned with the chord wall 61 so that the second end 82 of the pivot shaft 64 is slidably received in the seat 58. A setscrew 62 is threadably installed in the setscrew aperture 60 to bear against the face 86 to fixedly retain the pivot shaft 64 to the lower pivot arm 40.

Figure 7:
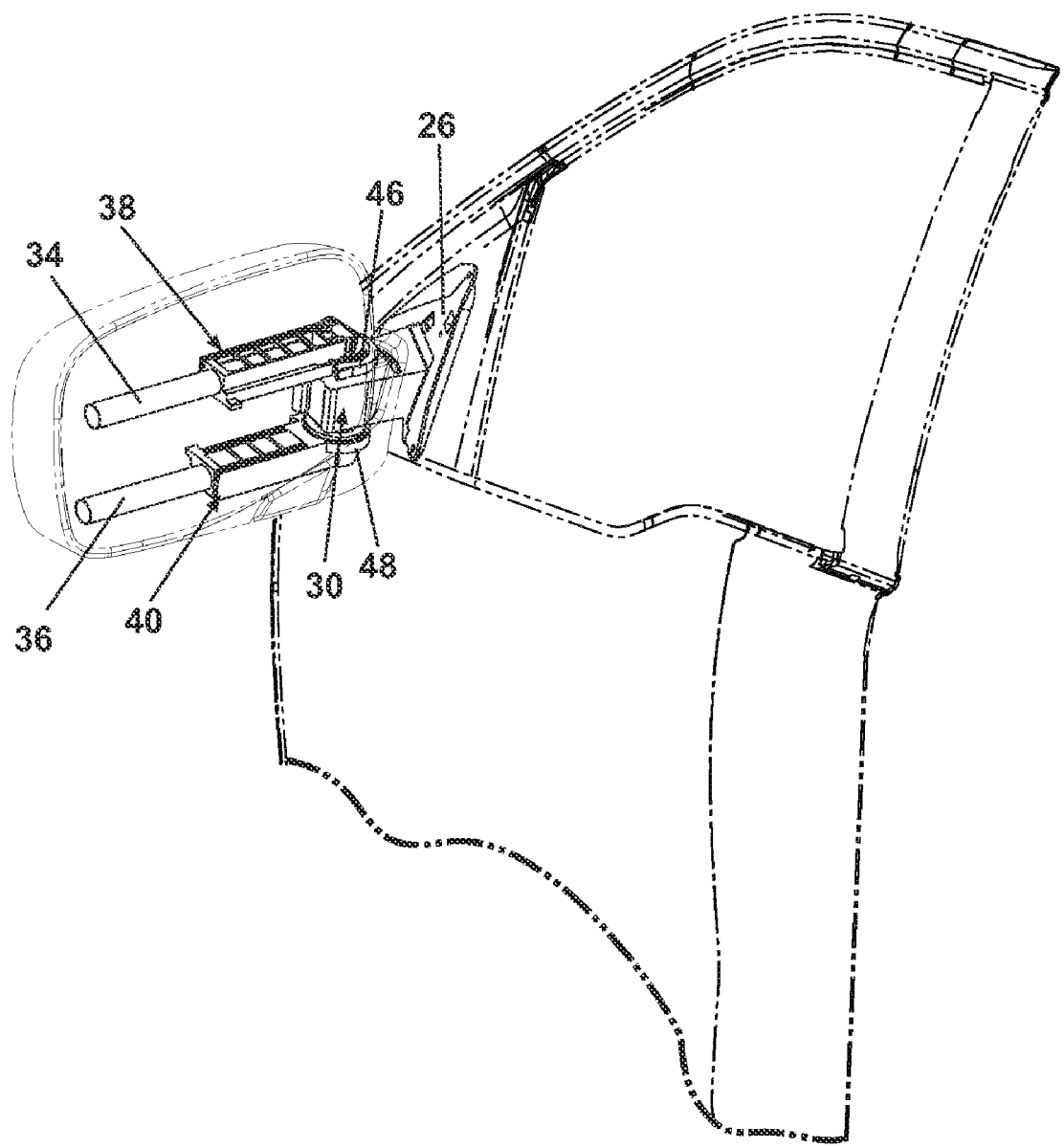
FIG. 7 is an enlarged perspective view of the reduced friction pivot assembly illustrated in FIG. 2 in a first position unfolded away from a vehicle.
Figure 8:
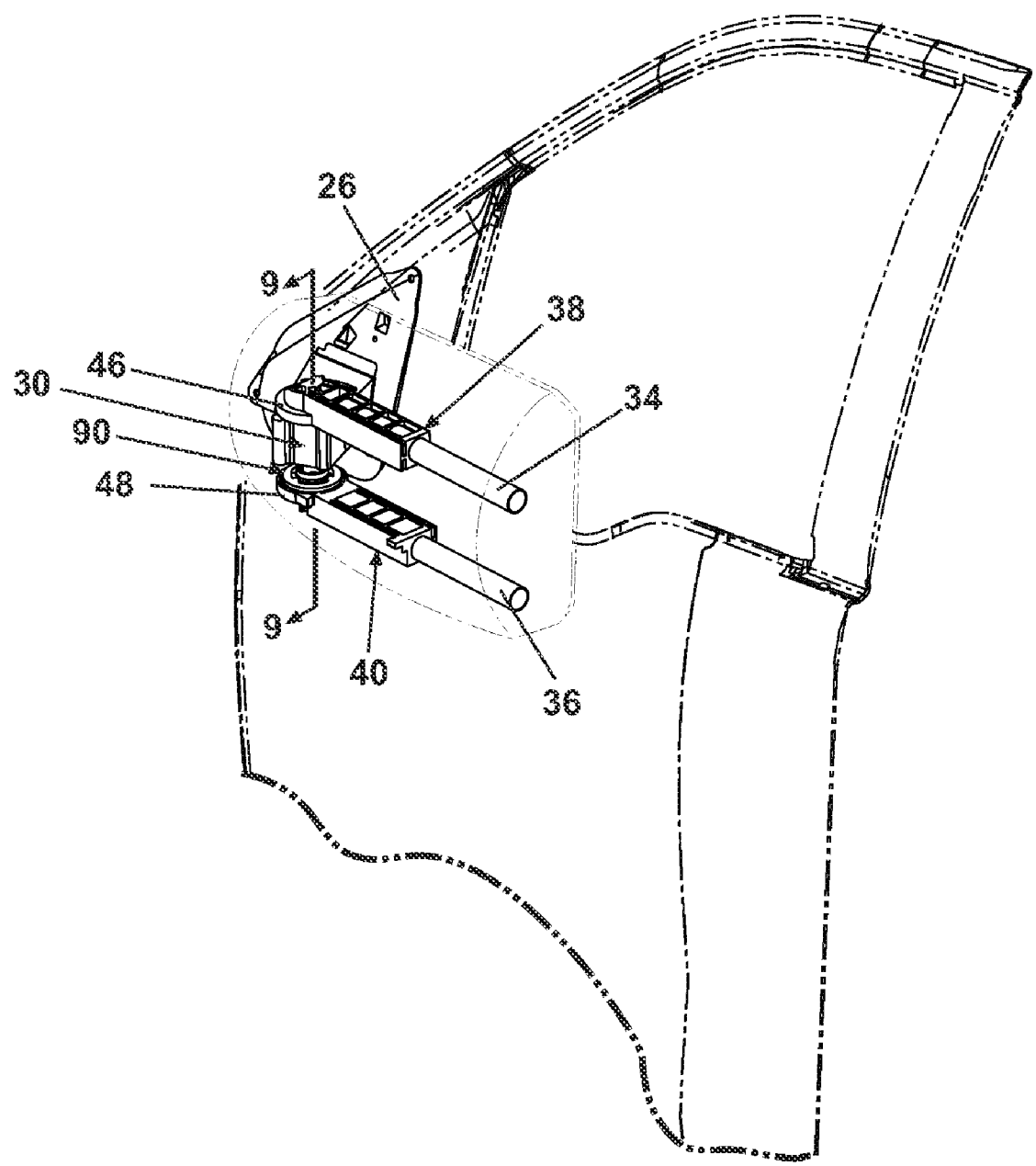
FIG. 8 is an enlarged perspective view of the reduced friction pivot assembly illustrated in FIG. 2 in a second position folded against the vehicle.

As so assembled, the ball bearings 98 will be rotationally received in the ball apertures 110 and seated within the ball seats 111 of the upper plate 90, and will contact the upper plate 90 and the lower plate 94. The spring 134 will urge the upper plate 90 against the ball bearings 98 to retain the ball bearings 98 in the ball seats 111 to restrict the pivotal movement of the reflective element assembly 14 relative to the base assembly 12, for example when the mirror system 10 is in the unfolded position (FIG. 7). However, with sufficient rotational force applied to the dual-arm tube assembly 32 to overcome the axial force of the spring 134, the ball bearings 98 will be moved from the ball seats 111 to ride along the raceway 106, for example when the mirror system 10 is in the folded position (FIG. 8). The lower plate 94 also serves as a smooth bearing surface for the travel of the ball bearings 98 along the raceway 106.

During normal powerfold operation, the transmission assembly 68, through engagement with the upper plate 90, will urge the rotation of the upper plate 90 about the pivot shaft 64. With the ball bearings 98 seated in the ball seats 111 through the influence of the spring 134, the bearing seat plate 92 will rotate with the rotation of the upper plate 90. Because the bearing seat plate 92 is keyed to the lower pivot arm 40, the rotation of the bearing seat plate 92 will urge the rotation of the lower pivot arm 40. The keying of the pivot shaft 64 in the lower pivot arm 40 will urge the rotation of the pivot shaft 64, which, because the pivot shaft 64 is keyed into the upper pivot arm 38, will also rotate the upper pivot arm 38.

Figure 12A:
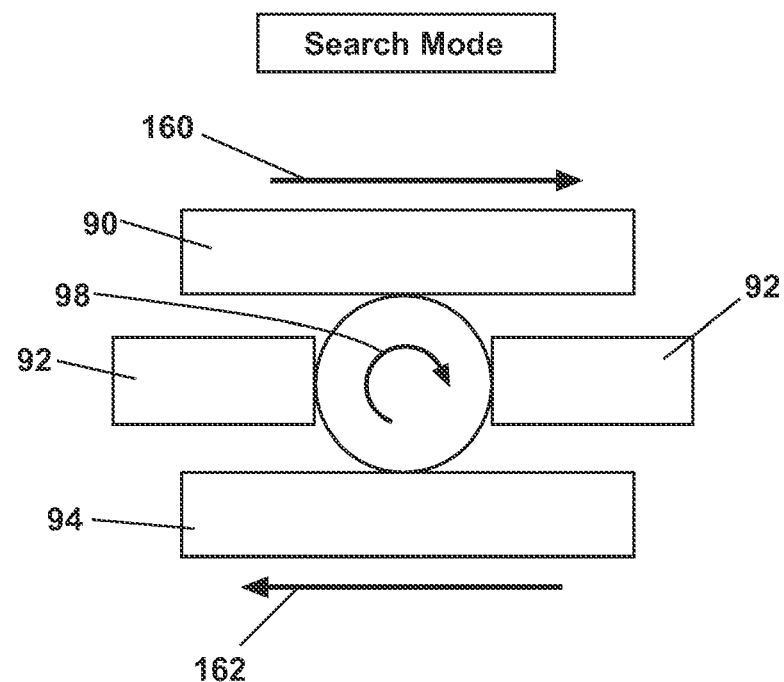
FIGS. 12A and B are schematic representations of the reduced friction pivot assembly illustrated in FIG. 2 in two modes of operation.

At times, the dual-arm tube assembly 32 may be intentionally or inadvertently rotated so that the ball bearings 98 are no longer seated in the ball seats 111. Operation of the powerfold assembly 66 will actuate the pivot bearing assembly 88 to return the ball bearings 98 to the ball seats 111. As illustrated in FIG. 12A, during this "search" mode, the dual-arm tube assembly 32 and the bearing seat plate 92 are stationary, and the upper plate 90 is rotated by the drive motor assembly 70 until the ball seats 111 engage the ball bearings 98, as indicated by the search mode upper plate vector 160. The ball bearings 98 roll along the raceway 106 during this process, with the center of each ball bearing 98 held stationary due to its seating in the ball apertures 110. The ball bearings 98 also roll relative to the lower plate 94, urging the lower plate 94 in the opposite direction as indicated by the search mode lower plate vector 162. The low friction washer 96 will enable the rotation of the lower plate 94 relative to the dual-arm tube assembly 32.

Figure 12B:
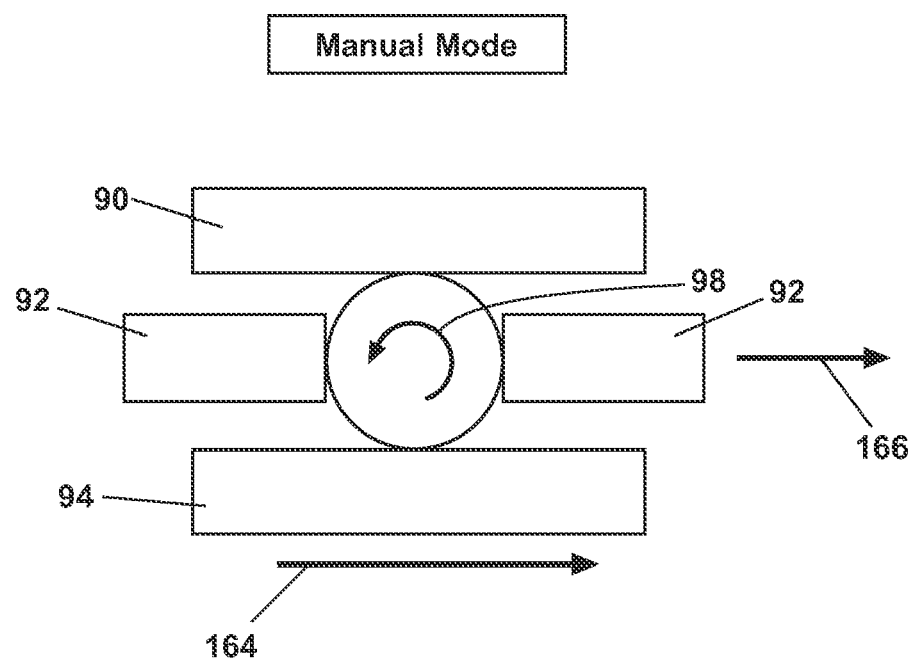

If, however, the dual-arm tube assembly 32 is manually rotated, the bearing seat plate 92 will be able to rotate relative to the upper plate 90, which will remain keyed to the transmission 68. As illustrated in FIG. 12B, during manual rotation of the dual-arm tube assembly 32, the upper plate 90 is held stationary due to its being keyed to the drive motor assembly 70. The bearing seat plate 92 rotates through a specific angle with the rotation of the dual-arm tube assembly 32, as indicated by the manual mode bearing seat plate vector 166, which urges the centers of the ball bearings 98 to move a complementary distance. The ball bearings 98 roll along the raceway 106. The lower plate 94 will rotate exactly twice the angular displacement of the bearing seat plate 92. Because the ball bearings 98 are in non-sliding rolling contact with the lower plate 94, the lower plate 94 will rotate in the direction indicated by the manual mode lower plate vector 164 a distance equal to twice the angular displacement of the dual-arm tube assembly 32. The low friction washer 96 will enable the rotation of the lower plate 94 relative to the dual-arm tube assembly 32.

FIGS. 13-30 illustrate a second embodiment of a reduced friction pivot assembly incorporated into a single arm vehicle mirror system. The second embodiment shares many elements of the first embodiment and, thus, like numerals will be used to identify like elements, except as otherwise indicated. Moreover, the description of the second embodiment will focus primarily on the reduced friction pivot assembly.

Figure 13:
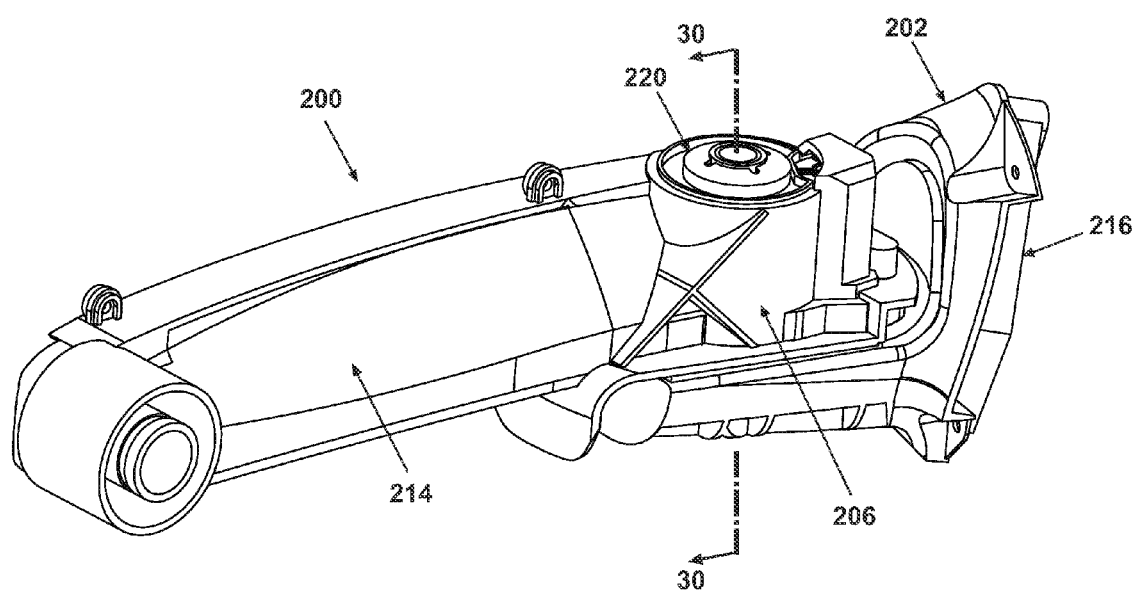
FIG. 13 is a perspective view of a second embodiment of a vehicle rearview mirror system according to the invention comprising a base assembly, a reduced friction pivot assembly, and a support frame assembly, with portions removed for clarity.

FIG. 13 illustrates a single arm vehicle mirror system 200 comprising a base assembly 202 attached to a pivot connection 206 to a single arm support frame assembly 214 for supporting a reflective element assembly (not shown). Housing elements used to enclose the illustrated mirror system components have been removed for clarity. The base assembly 202 comprises a base frame 216 attached to and supporting a reduced friction pivot assembly 220 which is utilized to selectively pivot the support frame assembly 214 between a first folded position and a second unfolded position.

Figure 14:
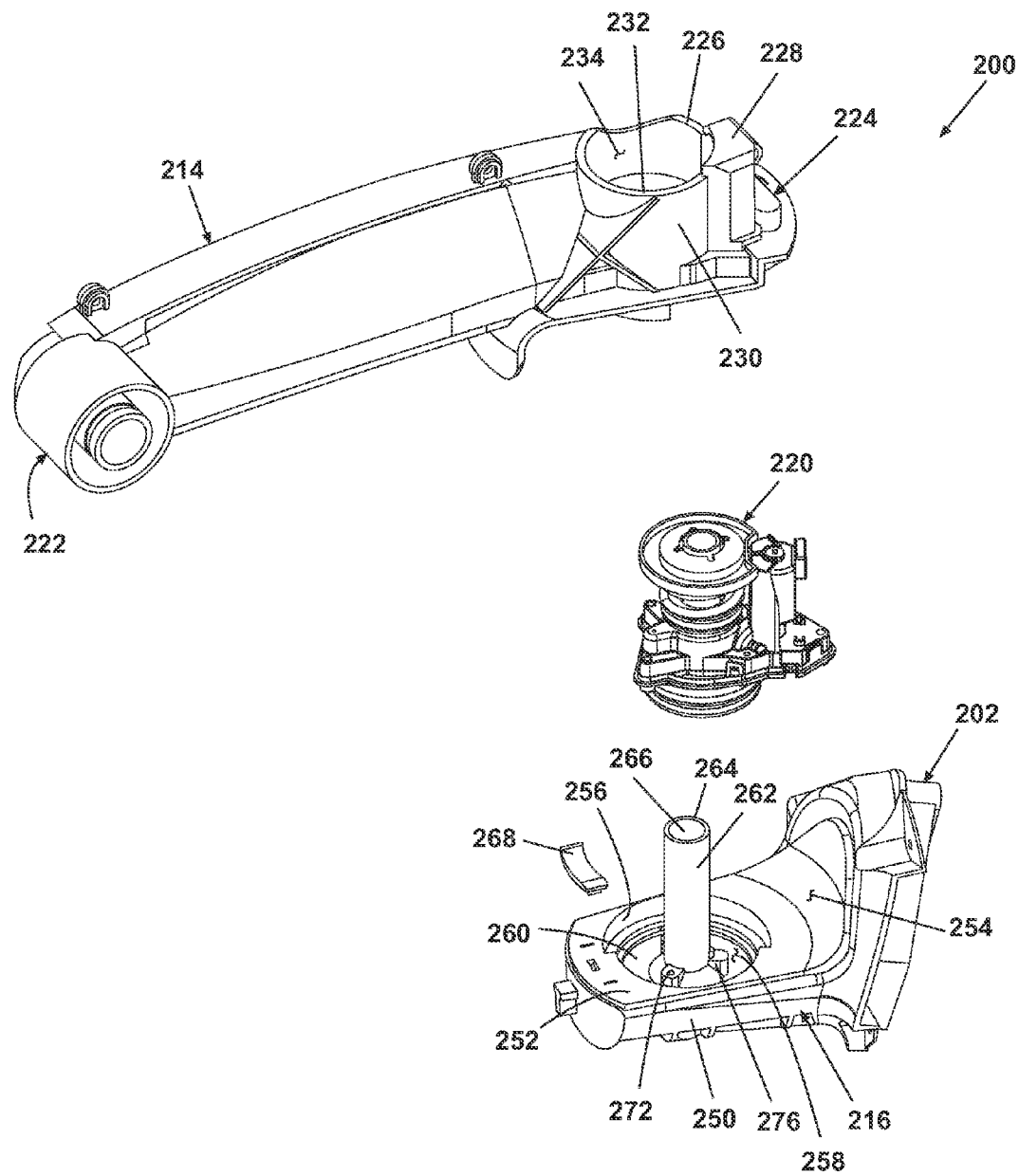
FIG. 14 is a partially exploded view of the vehicle rearview mirror system illustrated in FIG. 13.
Figure 15:
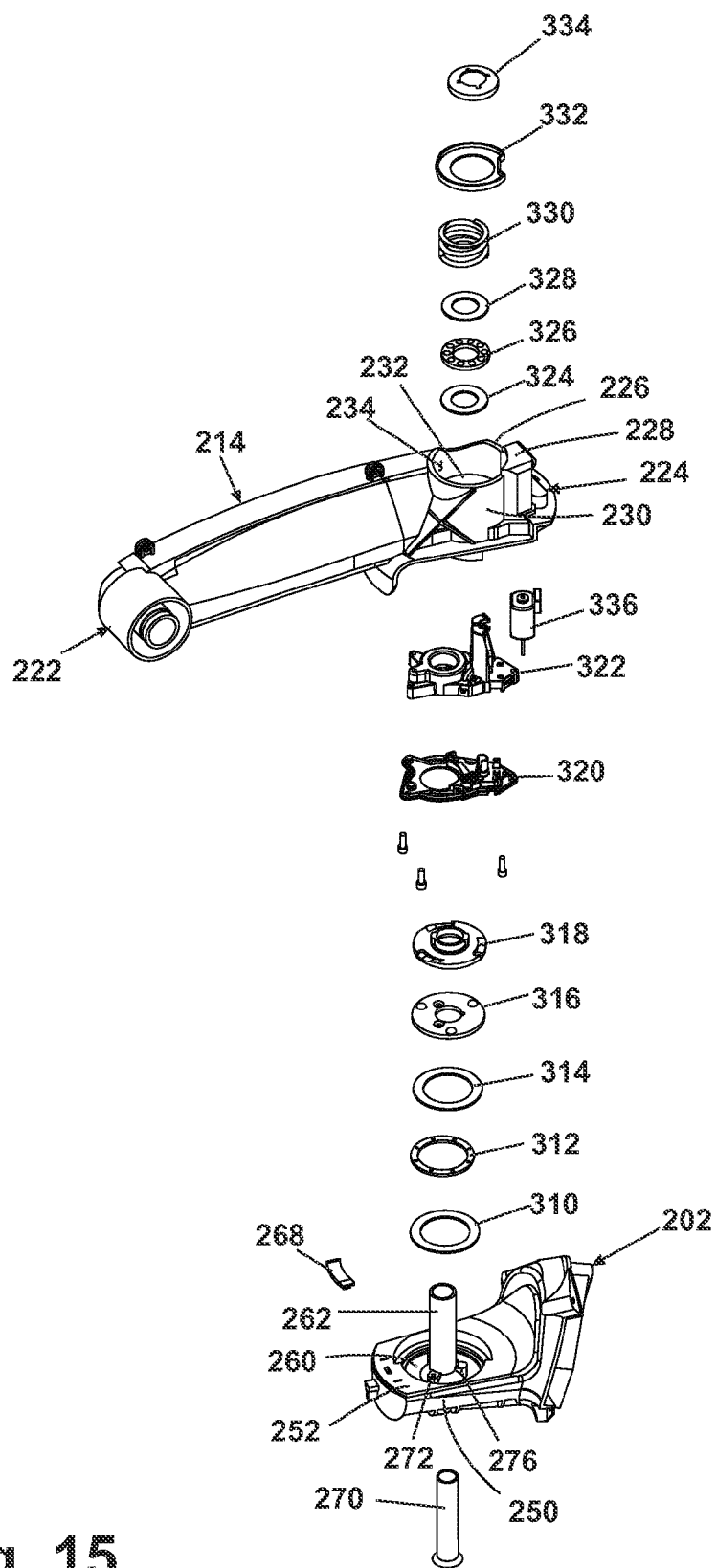
FIG. 15 is a fully exploded view of the vehicle rearview mirror system illustrated in FIG. 13.

FIGS. 14 and 15 illustrate the three main components of the mirror system 200 comprising the base assembly 202, the reduced friction pivot assembly 220, and the support frame assembly 214. The support frame assembly 214 comprises a distal end 222 adapted for attachment to a reflective element assembly, and a proximal end 224 comprising a pivot assembly housing 226 for enclosing and supporting the reduced friction pivot assembly 220. The pivot assembly housing 226 includes a pivot drive housing 228 extending radially therefrom.

Figure 16:
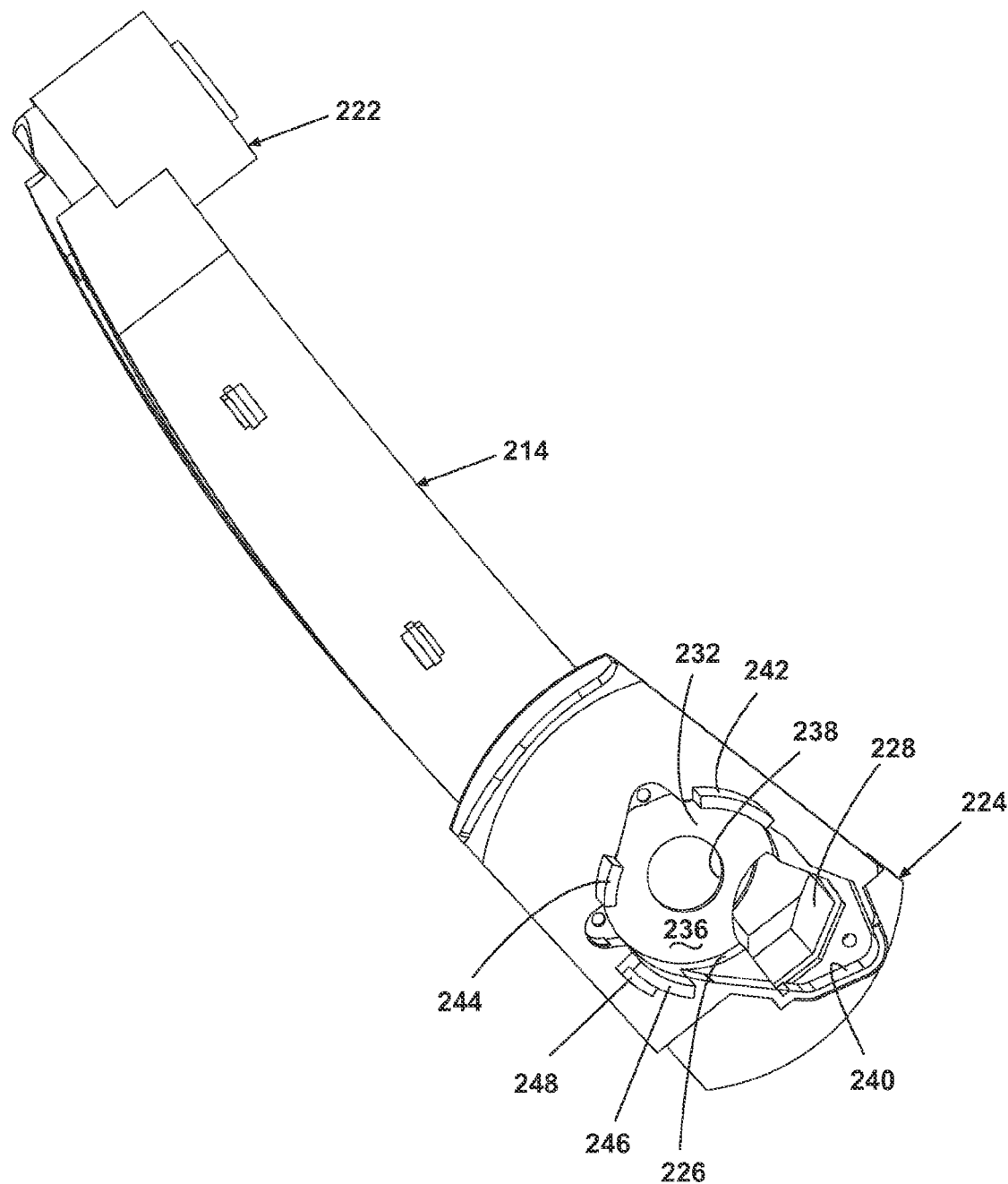
FIG. 16 is a perspective view of the underside of the support frame assembly illustrated in FIG. 13.

Referring also to FIG. 16, which provides a view from the underside of the support frame assembly 214, the pivot assembly housing 226 includes a circumferential wall 230 in communication with the pivot drive housing 228 and having a height and diameter suitable for enclosing the reduced friction pivot assembly 220. The circumferential wall 230 is intersected orthogonally by an annular wall 232 separating the pivot assembly housing 226 into an upper chamber 234 and a lower chamber 236. The annular wall 232 is provided with an aperture 238 extending coaxially therethrough.

FIG. 16 also illustrates a recess 240 extending perimetrically from the lower chamber 236 around the pivot drive housing 228. A trio of arcuate walls 242, 244, 246 extends away from the lower chamber 236 as a continuation of the circumferential wall 230. One of the arcuate walls 246 is provided with a stop block 248 extending radially outwardly therefrom.

Figure 17:
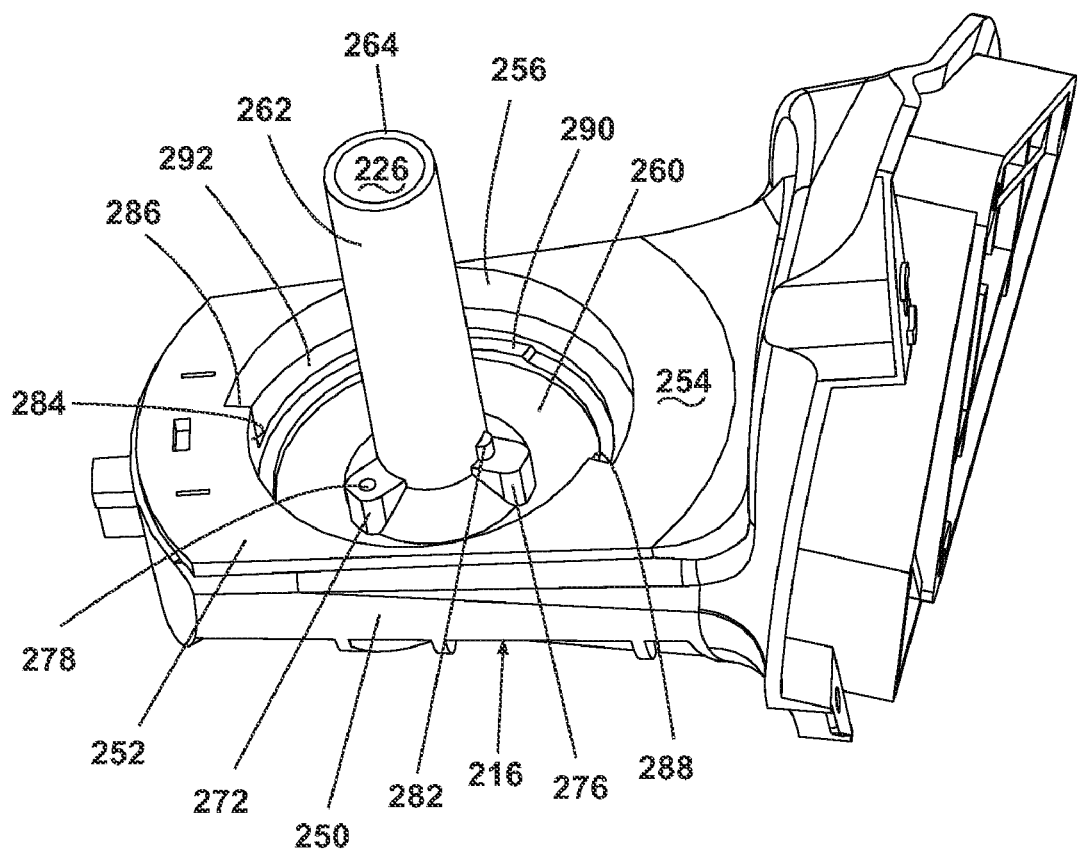
FIG. 17 is a perspective view of the base assembly illustrated in FIG. 13.

Referring again to FIG. 14 and to FIG. 17, the base assembly 202 comprises a cantilever arm 250 having an upper wall 252 defining a contact surface 254. A pivot mechanism well 258 is formed in the cantilever arm 250 and extends from the upper wall 252 to a bottom wall 260 spaced from and generally parallel to the upper wall 252. An arcuate outer circumferential wall 256 depends from the upper wall 252 and transitions through a pair of radial walls 286, 288 to an inner circumferential wall 284. The outer circumferential wall 256 transitions to an outer arcuate wall 292 which is parallel to the bottom wall 260 and terminates at the radial walls 286, 288. The outer arcuate wall 292 transitions to an intermediate annular wall 290 parallel to and spaced somewhat above the bottom wall 260. The inner circumferential wall 284 depends to the intermediate annular wall 290. The pivot mechanism well 258 is adapted to slidably receive the annular walls 242, 244, 246 when the support frame assembly 214 is attached to the base frame 216. The annular walls 242, 244, 246 will be slidably supported on the intermediate annular wall 290 and the stop block 248 will be received in the arcuate channel defined by the outer circumferential wall 256 and the outer arcuate wall 292. Engagement of the stop block 248 with the radial walls 286, 288 will define the limits of pivotal movement of the support frame assembly 214 relative to the base frame 216.

Extending coaxially upwardly from the bottom wall 260 is a pivot post 262 having an annular wall 264 defining a bore 266 therethrough. Extending in regular spacing, e.g. 120°, around the base of the pivot post 262 are a pair of mounting bosses 272, 274 and an alignment boss 276. The mounting bosses 272, 274, are provided with apertures 278, 280, respectively, therein, and the alignment boss 276 is provided with an upwardly extending alignment lug 282 in registry with and radially disposed from the annular wall 264. A tube-like reinforcing post 270 can be inserted through the pivot post 262 to reinforce the pivot post 262 against pending moments imposed by the weight and movement of the support frame assembly 214 relative to the base frame 216. The reinforcing post 270 is fabricated of a lightweight material having a suitable strength for the purposes described herein, such as a high strength plastic or aluminum. Alternatively, reinforcement can be fabricated into the pivot post 262. Referring again to FIG. 14, attached to the upper wall 252 is a bearing plate 268 adapted for slidable communication with the support frame assembly 214. The bearing plate 268 is preferably fabricated of a low friction material, such as a POM acetal molded pad, or a polytetrafluoroethylene-based material manufactured by Saint-Gobain Corporation of Valley Forge, Pa. The bearing plate 268 is attached to the upper wall 252 through a suitable fastening mechanism, such as a well-known snap-fit connection. The bearing plate 268 serves as a spacer and support reinforcement to reduce vibration of the reflective element assembly when the support frame assembly 214 is extended for use away from the vehicle.

Figure 18:
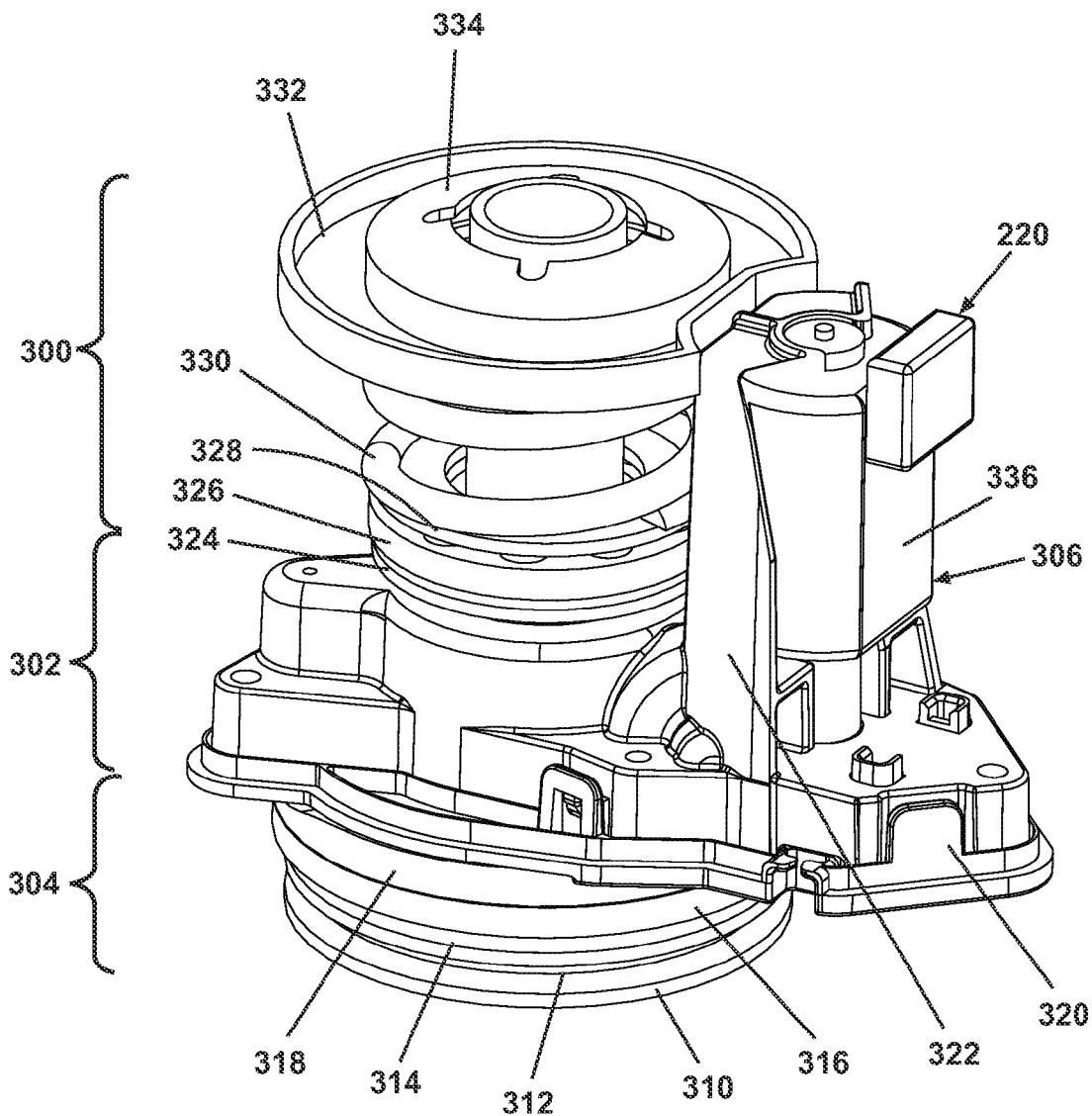
FIG. 18 is an enlarged perspective view of the reduced friction pivot assembly illustrated in FIG. 13.

FIG. 18 illustrates in detail the reduced friction pivot assembly 220. The reduced friction pivot assembly 220 comprises an upper bearing assembly 300, a housing assembly 302, a lower bearing assembly 304, and a pivot drive assembly 306. Referring also to FIG. 15, the lower bearing assembly 304 comprises a lower washer 310, a lower thrust bearing 312, and an upper washer 314 in stacked registry. The lower thrust bearing 312 comprises a well-known ball bearing assembly comprising a plurality of balls mounted in a raceway. The lower thrust bearing 312 enables the washers 310, 314 to move relative to each other. Alternatively, the lower thrust bearing 312 can be replaced with a low-friction washer, such as a POM acetal molded pad fabricated in the form of a washer.

Figure 20:
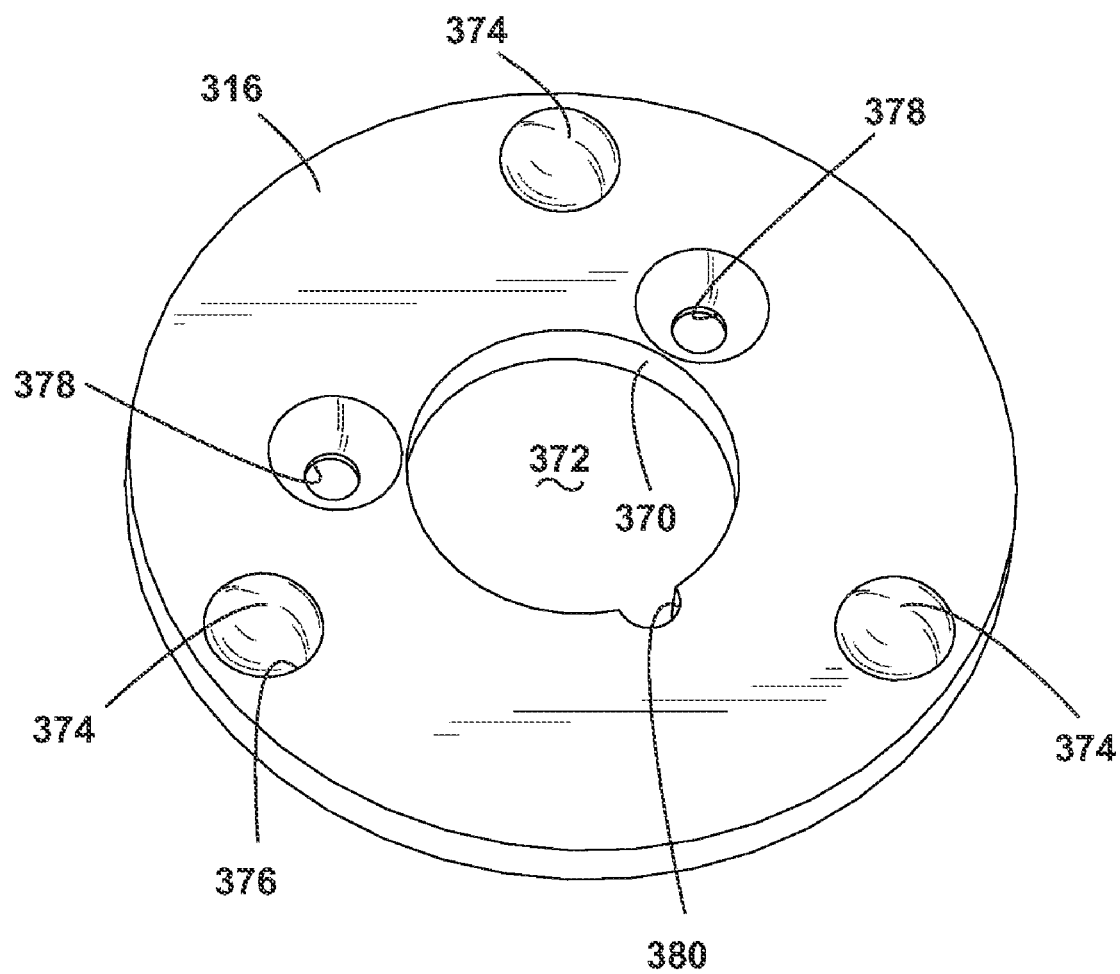
FIG. 20 is an enlarged perspective view of a ball bearing race comprising a portion of the reduced friction pivot assembly illustrated in FIG. 13.

The lower bearing assembly 304 also comprises a ball bearing race 316 and a detent plate 318 in cooperative registry with one another and with the washers 310, 314 and the lower thrust bearing 312. As illustrated in FIG. 20, the ball bearing race 316 is a generally annular plate-like structure having a diameter adapted for slidable disposition of the ball bearing race 316 in the pivot mechanism well 258. A circular annular wall 370 defines a post aperture 372 extending coaxially through the ball bearing race 316. A plurality of balls 374, preferably numbering three, is seated in regularly-spaced ball seats 376 extending through the ball bearing race 316. As illustrated in FIG. 20, 3 ball seats 376 are spaced at 120° at a preselected radius. A greater number of balls 374 and ball seats 376 can be employed in regular spacing about the ball bearing race 316. A pair of apertures 378 adapted for receipt of threaded fasteners therethrough are suitably located for attaching the ball bearing race 316 to the mounting bosses 272, 274. The annular wall 370 is provided with a radially-outwardly disposed notch at 366 adapted for slidable communication with the alignment boss 276 to facilitate the attachment of the ball bearing race 316 to the base frame 216.

Figure 21:
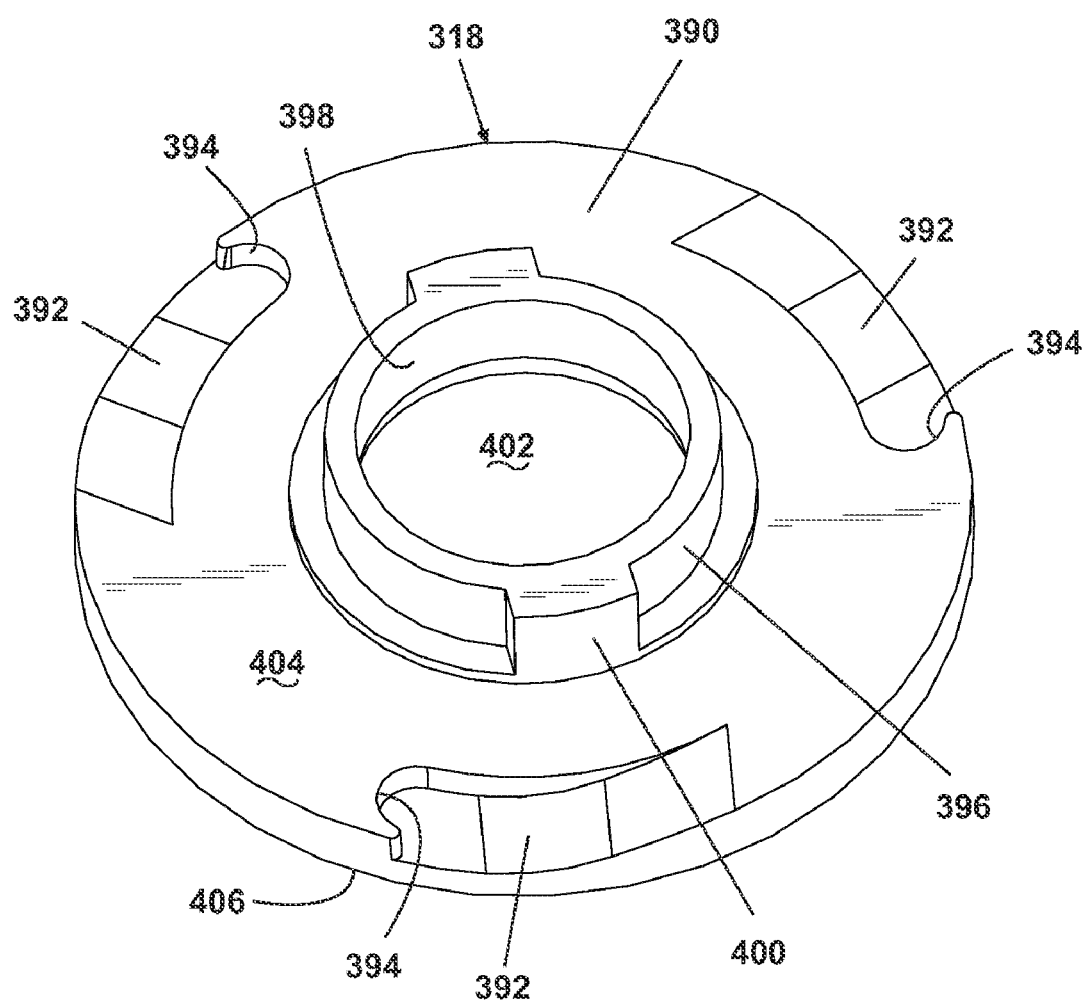
FIG. 21 is an enlarged perspective view from above of a detent plate comprising a portion of the reduced friction pivot assembly illustrated in FIG. 13.
Figure 22:
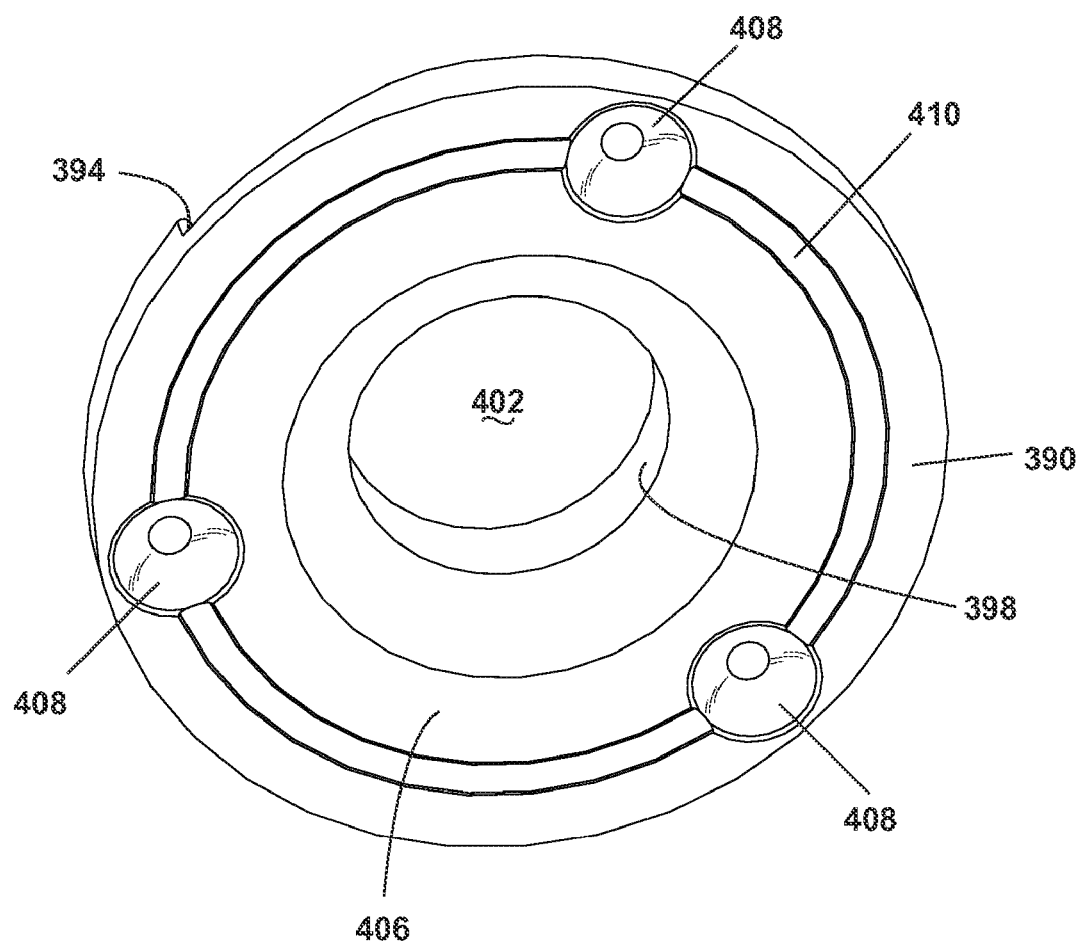
FIG. 22 is an enlarged perspective view from below of the detent plate illustrated in FIG. 21.
Figure 23:
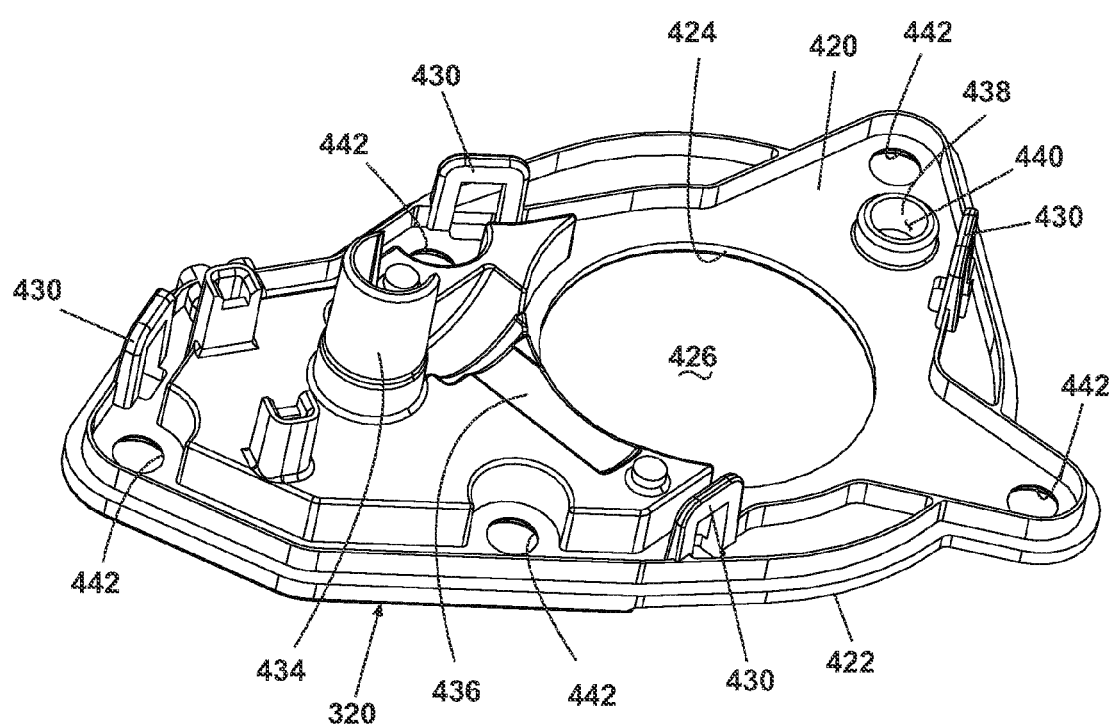
FIG. 23 is an enlarged perspective view of a lower housing piece comprising a portion of the reduced friction pivot assembly illustrated in FIG. 13.

Referring now to FIGS. 21 and 22, the detent plate 318 is a circular plate-like body having a diameter generally equal to the diameter of the ball bearing race 316 and comprising a circular plate 390 having a planar upper side 404 and an opposed planar lower side 406. The upper side 404 is provided along the circumference thereof with a trio of regularly-spaced downwardly inclined arcuate ramps 392 terminating in end walls 394. Extending coaxially upwardly from the upper side 404 is an annular collar 396 forming an aperture 398 to define a post opening 402 through the detent plate 318. Extending diametrically outwardly from the annular collar 396 are a pair of generally rectilinear bosses 400. Referring specifically to FIG. 22, the lower side 406 is provided with a trio of regularly-spaced, hemispherical ball seats 408 in communication with a circular channelway 410. The ball seats 408 are adapted for cooperative registry with the balls 374 of the ball bearing race 316.

Figure 19:
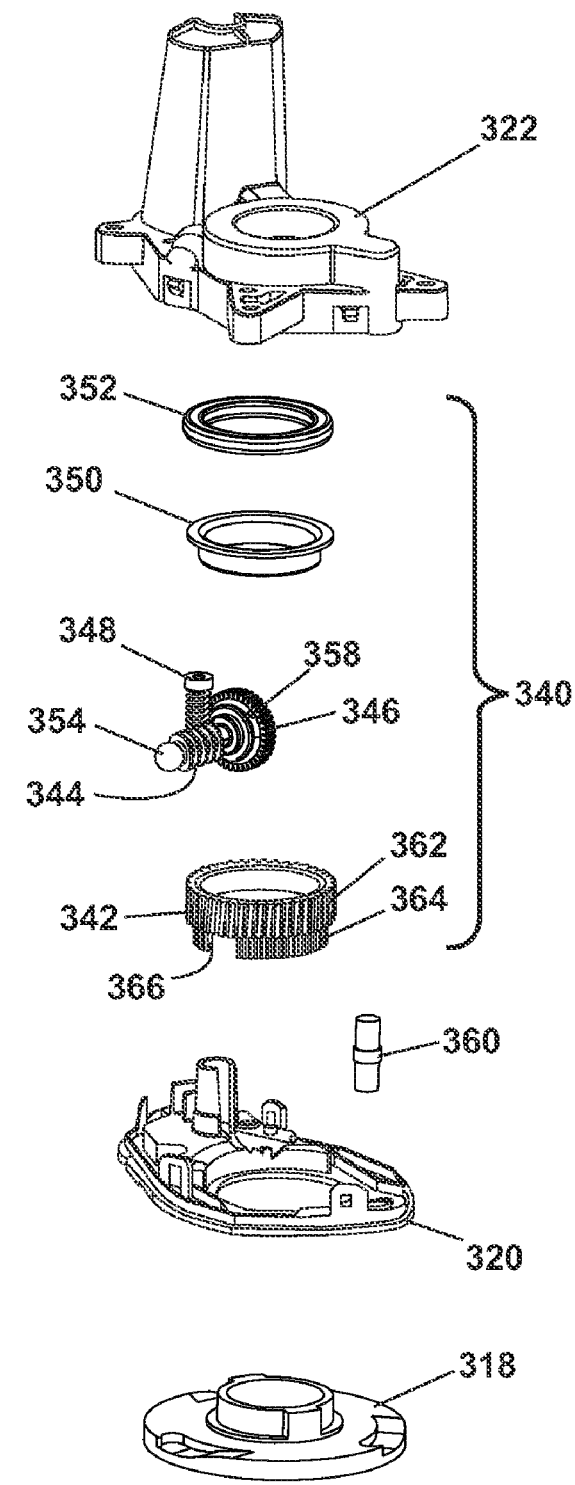
FIG. 19 is an exploded view of a motorized pivot mechanism comprising a portion of the reduced friction pivot assembly illustrated in FIG. 13.

Referring again to FIG. 18 and to FIG. 19, the housing assembly 302 comprises a lower housing piece 320 and an upper housing piece 322 supporting and enclosing a motor 336 and a transmission assembly 340. The lower housing piece 320 is a generally flattened, irregularly-shaped body having an upper surface 420 and an opposed lower surface 422. The lower housing piece 320 is provided with a circular aperture 424 therethrough defining a post opening 426.

Extending upwardly from the upper surface 420 are a plurality of well-known upper housing latches 434 for attaching the lower housing piece 320 to the upper housing piece 322. A generally annular motor shaft collar 434 extends upwardly from the upper surface 420. Adjacent the motor shaft collar 434, a transmission cradle 436 is formed in the upper surface 420. An annular peg collar 438 extends upwardly from the upper surface 420 to define a circular peg opening 440 therethrough. A plurality of mounting apertures 442 are located along the perimeter of the lower housing piece 320.

Figure 24:
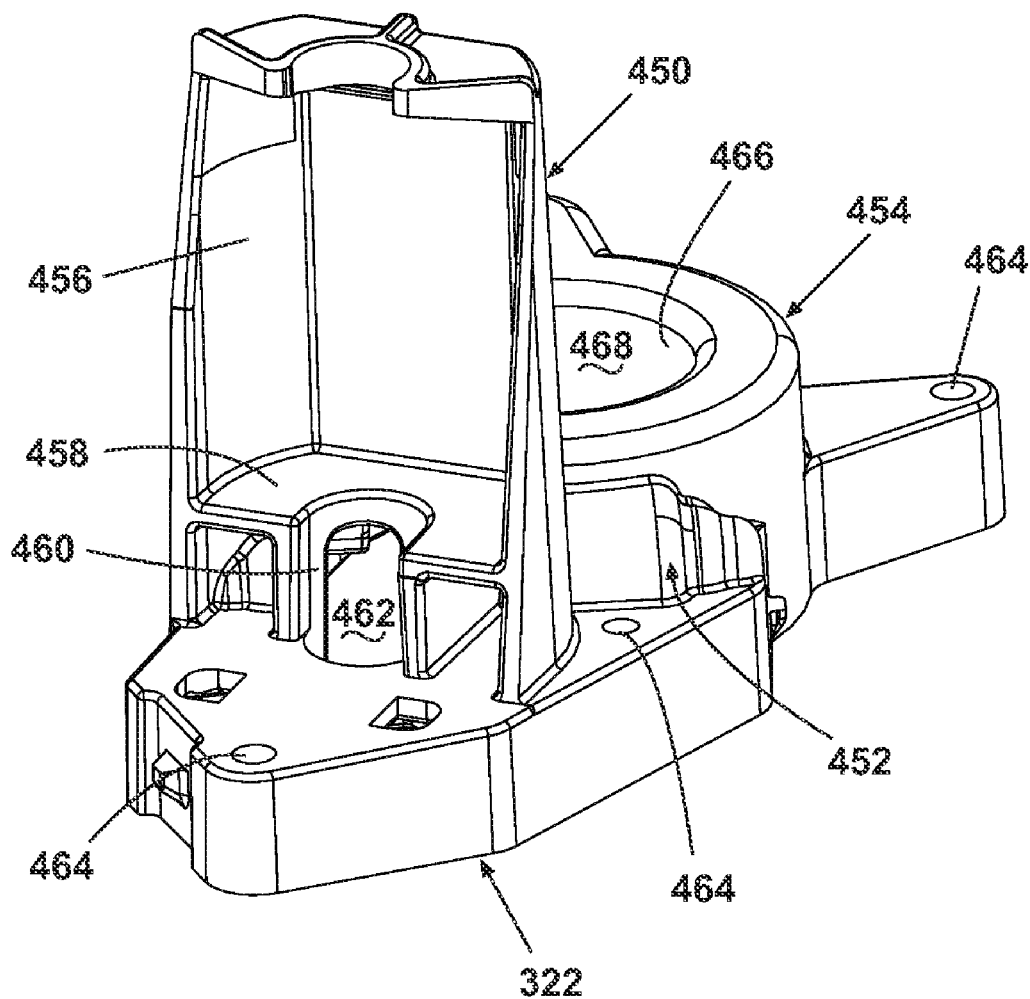
FIG. 24 is an enlarged perspective view from above of an upper housing piece comprising a portion of the reduced friction pivot assembly illustrated in FIG. 13.
Figure 25:
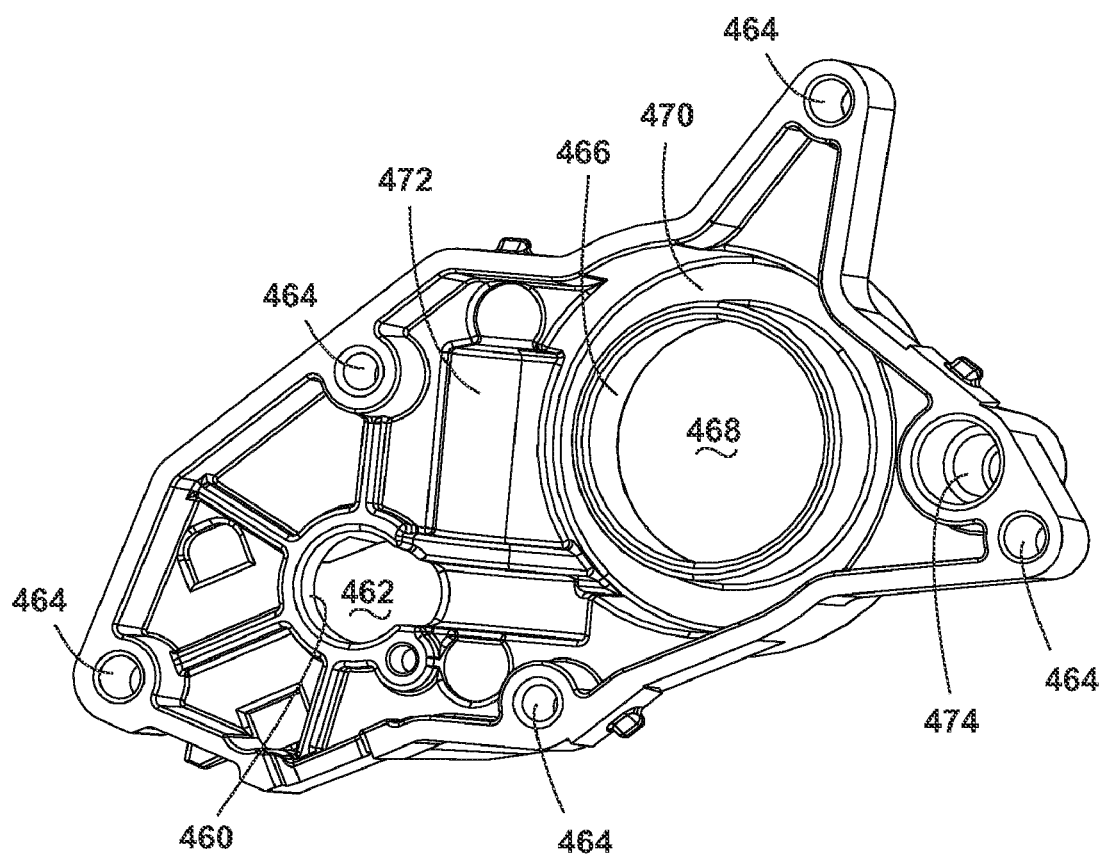
FIG. 25 is an enlarged perspective view from below of the upper housing piece illustrated in FIG. 24.

Referring now to FIGS. 24 and 25, the upper housing piece 322 is an irregularly-shaped body comprising a motor housing 450, a transmission housing 452, and a gear housing 454. The motor housing 450 is a generally elongated structure comprising a perimeter wall 456 having a configuration adapted for partial enclosure of a drive motor (not shown), and terminating in a support wall 458 adapted for support of the drive motor. Extending downwardly from the support wall 458 is a semi-annular shaft wall 460 defining a shaft opening 462 extending to an underside of the upper housing piece 322 (FIG. 25).

The transmission housing 452 defines a transmission cradle 472 adapted for cooperative registry with the transmission cradle 436 of the lower housing piece 320 for enclosure of a transmission assembly as hereinafter described.

The gear housing 454 is a somewhat annular body having an annular housing wall 466 defining a post opening 468 therethrough. The annular housing wall 466 extends downwardly into the underside of the upper housing piece 322 to define an annular gear seat 470 circumscribing the housing wall 466. A cylindrical peg seat 474 is adapted for receipt of a cylindrical movable peg 360 as hereinafter described. A plurality of mounting apertures 464 are located along the perimeter of the upper housing piece 322. With the upper housing piece 322 attached to the lower housing piece 320, the integrated structure can be attached to the support frame assembly 214 by inserting the upper housing piece 322 into the recess 240 and securing the lower and upper housing pieces 320, 322 to the support frame assembly 214 with suitable threaded fasteners (not shown) inserted through the apertures 442, 464 into suitable mating apertures in the support frame assembly 214.

Referring again to FIG. 18, the upper bearing assembly 300 comprises a lower washer 324, and an upper washer 328, with an upper thrust bearing 326 sandwiched therebetween. A helical spring 330 is disposed coaxially with the washers 324, 328 and the thrust bearing 326. A top retainer 332 is disposed coaxially against the spring 330, and a pal nut 334 is disposed coaxially against the top retainer 332. The housing assembly 302 is adapted so that the gear housing 454 is in registry with the annular wall 232 of the support frame assembly 214. The upper bearing assembly 300 is received within the upper chamber 234 of the support frame assembly 214 so that the lower washer 324 is in registry with the annular wall 232.

Referring now to FIGS. 18 and 19, the lower and upper housing pieces 320, 322 enclose a transmission assembly 340 comprising a detent plate gear 342, a worm 344, a drive gear 346, a motor worm 348, a gear bearing 350, and a spacer 352. The transmission assembly 340 is of a generally well-known configuration wherein the motor worm 348 is adapted for fixed attachment to the axle of a generally conventional electric drive motor 336. The motor worm 348 engages the drive gear 346 which is cooperatively connected to the worm 344 for rotation therewith. The worm 344 is provided with worm bearings 354, 356 at each end, and cooperatively engages the detent plate gear 342 for rotation therewith. A clutch assembly 358 can be utilized between the drive gear 346 and the worm 344 to enable rotation of the worm 344 independent of the rotation of the drive gear 346.

The detent plate gear 342 is a generally annular body having an upper gear portion 362 and a lower gear portion 364 having a diameter somewhat less than the diameter of the upper gear portion 362. A pair of diametrically-opposed, generally rectilinear notches 366 interrupts the lower gear portion 364. The detent plate gear 342 is adapted for slidable receipt over the collar 396 of the detent plate 318, with the rectilinear bosses 400 in cooperative registry with the rectilinear notches 366. Thus, the detent plate gear 342 is fixed to the detent plate 318.

Figure 26:
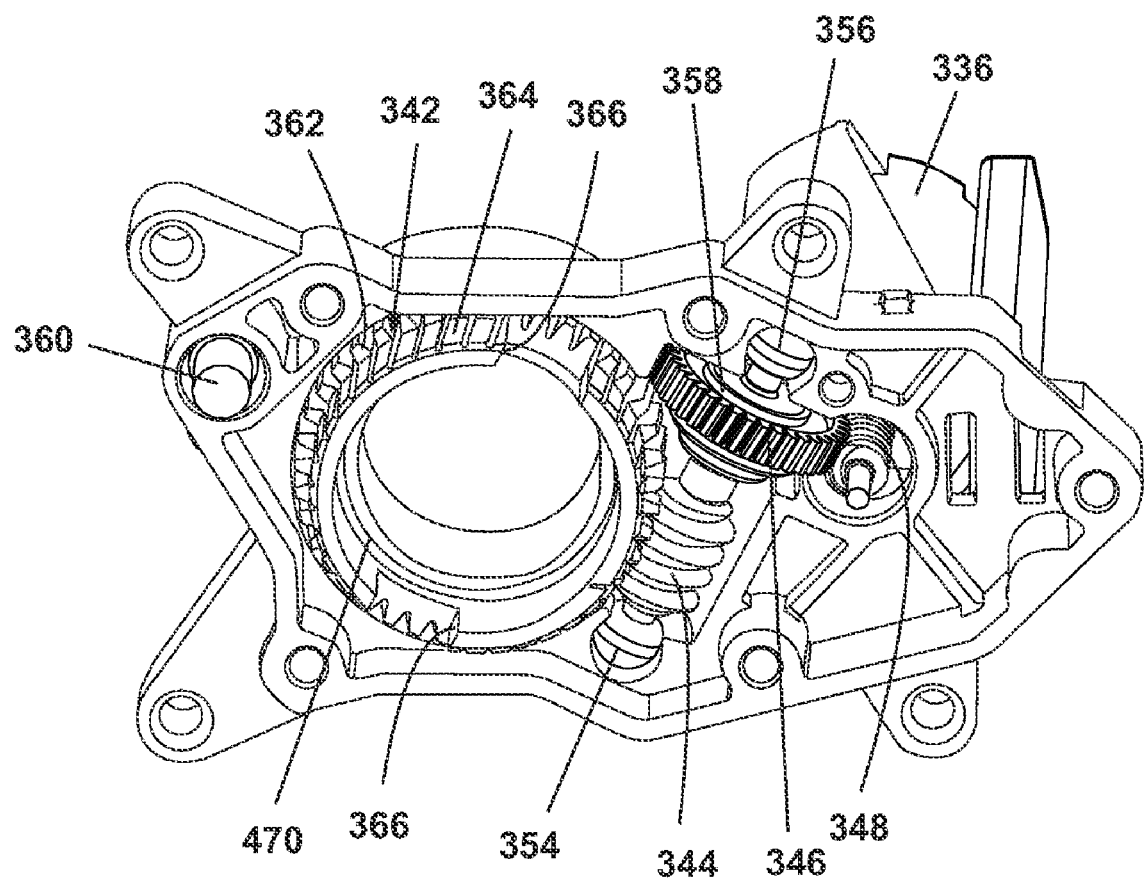
FIG. 26 is an enlarged perspective view from below of the upper housing piece illustrated in FIG. 25 with a motor and transmission installed therein.

The gear bearing 350 is a generally ring-like body having an annular wall transitioning to a radially outwardly disposed circular flange, adapted so that the annular wall is received within the upper gear portion 362 and the circular flange extends over the end of the upper gear portion 362. The gear bearing 350 is fabricated of a suitable low friction material so that the detent plate gear 342 can readily rotate relative to the gear bearing 350. The spacer 352 is a generally ring-like structure adapted for seating in the gear seat 470 of the upper housing piece 322 to minimize vertical movement of the detent plate gear 342 within the housing assembly 302. FIG. 26 illustrates the detent plate gear 342 assembled to the upper housing piece 322 with the gear bearing 350 and the spacer 352.

As also illustrated in FIG. 26, the motor 336 is received in the motor housing 450 so that the motor worm 348 is received through the shaft opening 462. The worm 344 and the drive gear 346 are received in the cradle 472 for cooperative registry with the motor worm 348, and the detent plate gear 342. With the lower housing piece 320 assembled to the upper housing piece 322, the worm 344 and a drive gear 346 will also be supported by the cradle 372 in the lower housing piece 320.

Figure 29:
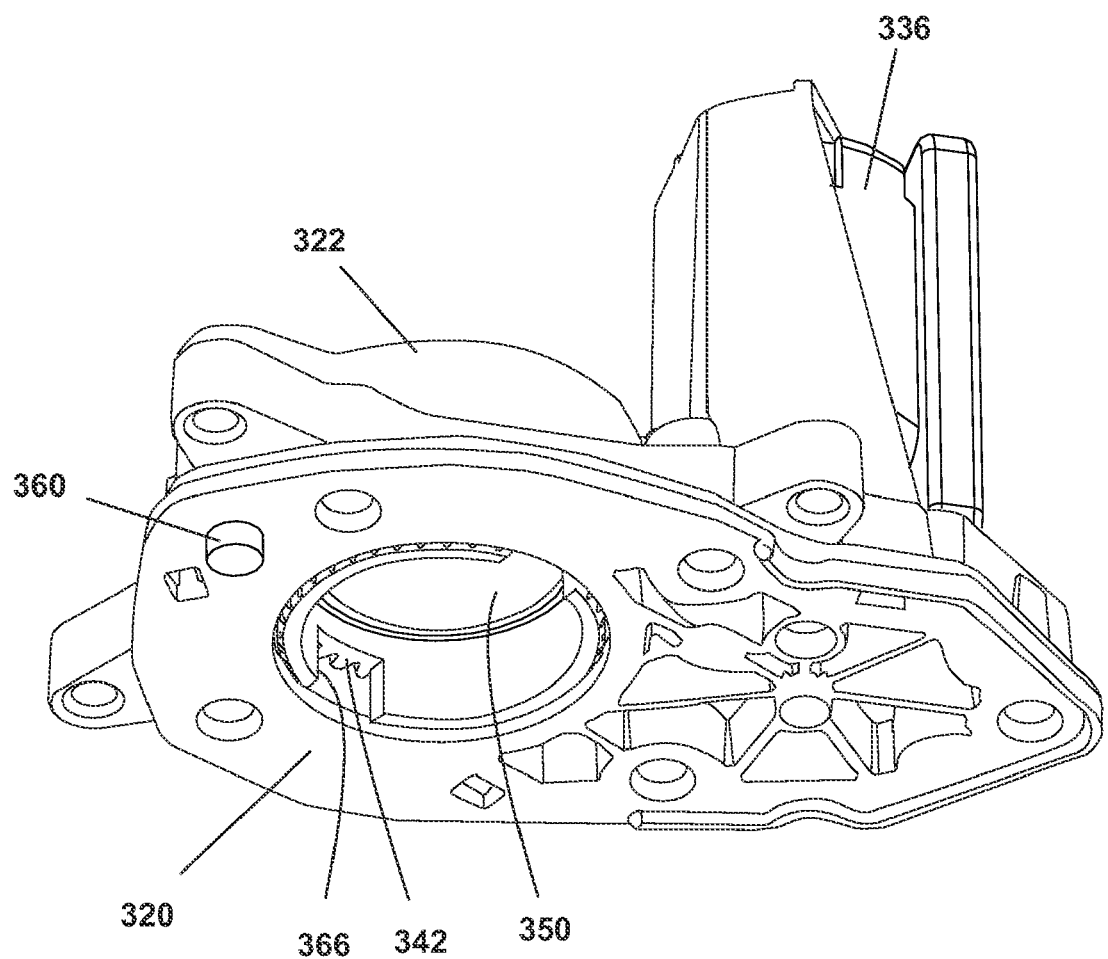
FIG. 29 is an enlarged perspective view from below of the assembly illustrated in FIG. 28, with the detent plate removed for clarity.

As illustrated also in FIG. 29, the movable peg 360 is also received in the peg seat 474 to extend through the peg opening 440 in the lower housing piece 320. The movable peg 360 is biased through the lower housing piece 320 by a helical spring received in the peg seat 474.

Figure 27:
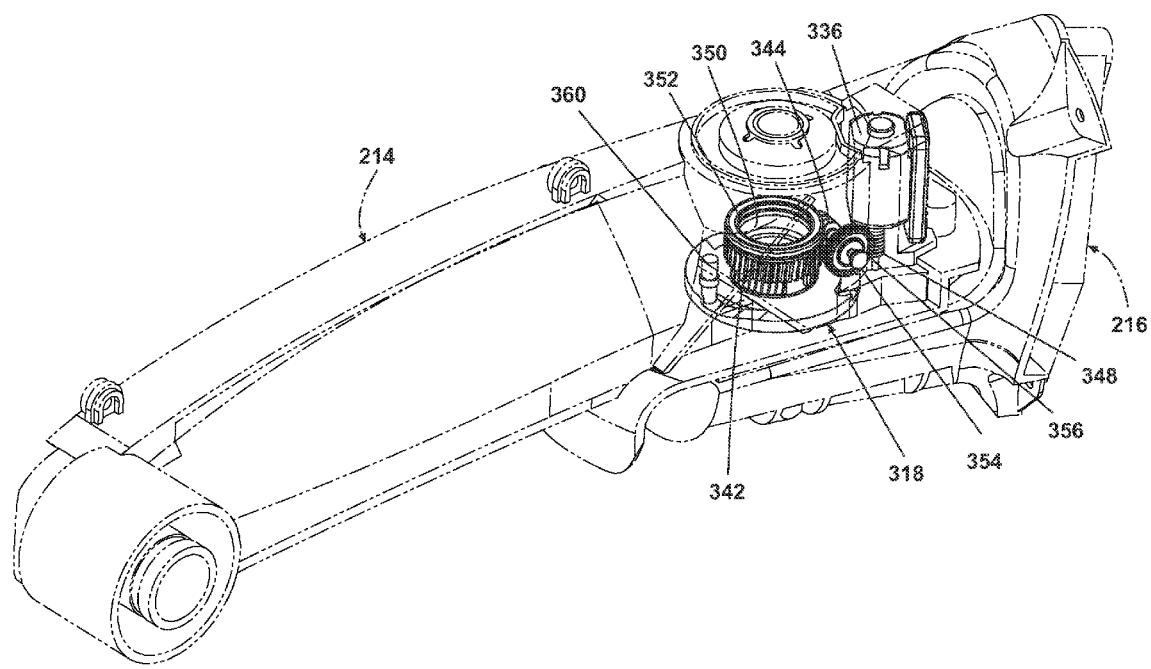
FIG. 27 is an enlarged perspective view of the assembled motor and transmission with elements removed for clarity.
Figure 28:
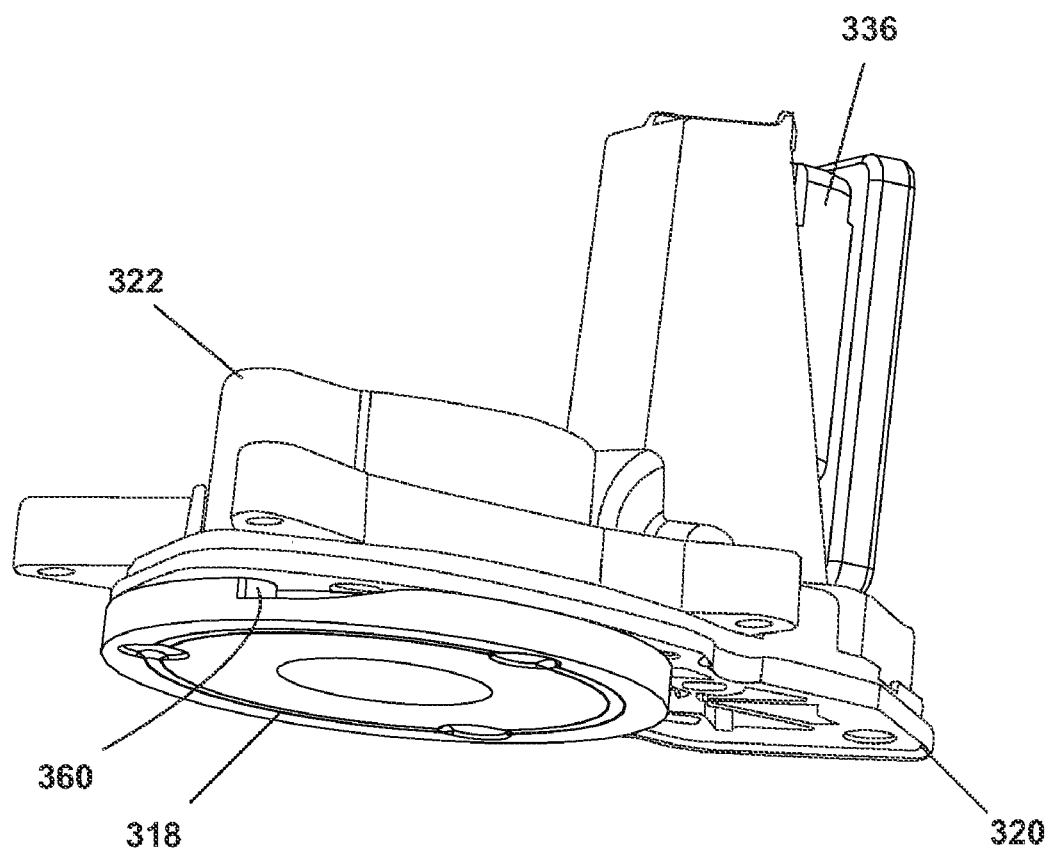
FIG. 28 is an enlarged perspective view of the upper and lower housing pieces enclosing the assembled motor and transmission, and the attached detent plate, illustrated in FIG. 13.

The lower gear portion 364 of the detent plate gear 342 extends through the post opening 426 in the lower housing piece 320 for engagement with the detent plate 318 as previously described, and as shown in FIGS. 27 and 29. As also shown in FIG. 27 and in FIG. 28, the movable peg 360 will be biased into engagement with a ramp 392 and an end wall 394 of the detent plate 318.

Figure 30:
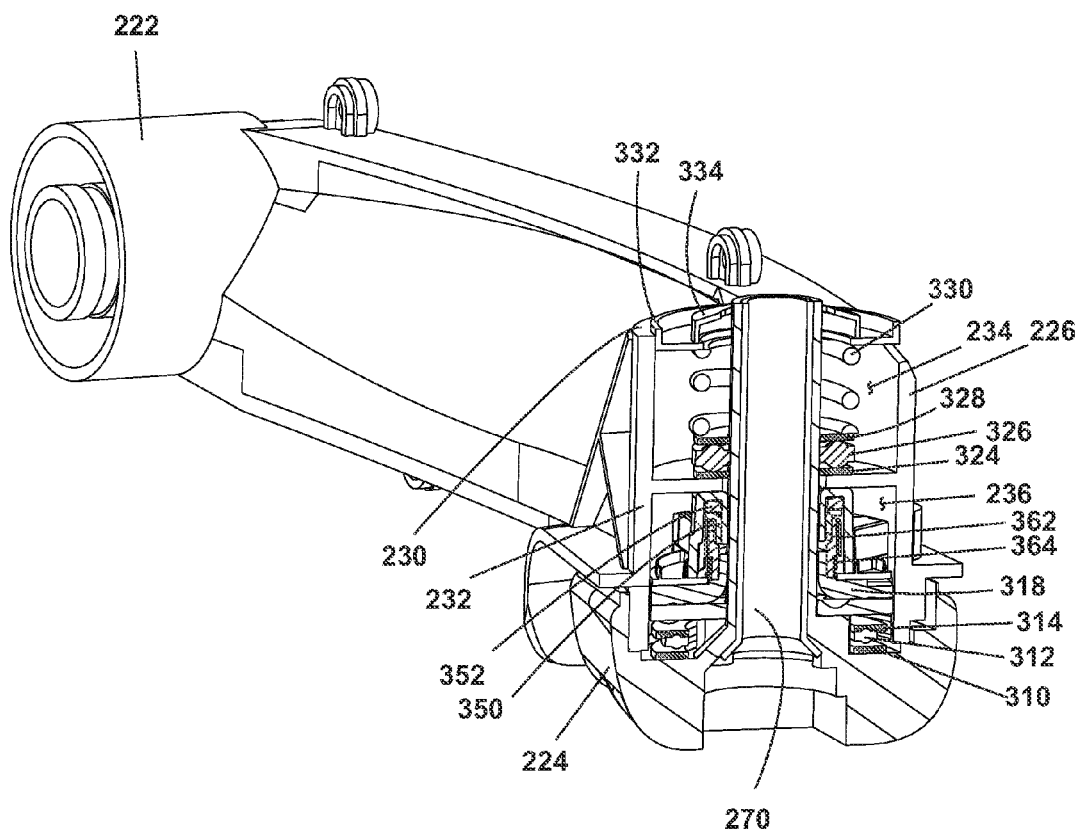
FIG. 30 is a sectional view taken along view line 30-30 of FIG. 13.

Referring again to FIGS. 14, 15, and 18, and particularly to FIG. 30, the support frame assembly 214 and the reduced friction pivot assembly 220 are assembled to the base frame 216 by first installing the lower washer 310, lower thrust bearing 312, and upper washer 314 over the pivot post 262 into the pivot mechanism well 258. The ball bearing race 316 is then installed over the pivot post 262 in registry with the upper washer 314 and attached to the base frame 216 as previously described herein. Thus, the ball bearing race 316 is immobile relative to the base frame 216. The balls 374 in the ball bearing race 316 can spin, causing the upper washer 314 to spin, and consequently the lower thrust bearing 312 to spin. Thus, while the ball bearing race 316 is immobile relative to the base frame 216, the balls 374 can freely spin.

The assembled housing assembly 302, with the transmission assembly 340 and the motor 336 included, is assembled to the support frame assembly 214 as previously described, with the post opening 468 of the upper housing piece 322, the post opening 426 of the lower housing piece 320, and the detent plate gear 342 in coaxial alignment. Thus, the housing assembly 302, and the transmission assembly 340 are fixedly attached to the support frame assembly 214. However, the detent plate gear 342 is able to spin relative to the housing assembly 302.

The detent plate 318 is aligned with the lower housing piece 320 for engagement of the detent plate 318 with the detent plate gear 342 as previously described. The detent plate 318, along with the detent plate gear 342, is able to rotate relative to the housing assembly 302. The detent plate 318 and support frame assembly 214 are slidably inserted over the pivot post 262 to bring the detent plate 318 into registry with the ball bearing race 316. The detent plate 318 can be positioned so that the balls 374 can be received in the ball seats 408. Thus, the detent plate 318 will remain fixed relative to the ball bearing race 316 and the base frame 216 while the balls 374 remain in the ball seats 408.

With the support frame assembly 214 in registry with the base frame 216, the lower washer 324, the upper thrust bearing 326, and the upper washer 328 are installed over the pivot post 262 in the upper chamber 234 in registry with the annular wall 232. The helical spring 330 is installed over the pivot post 262 in registry with the upper washer 328, the top retainer 332 is brought over the pivot post 262 in registry with the spring 330, and the pal nut 334 is brought into registry with the pivot post 262 and secured thereto in a well known manner. The spring 330 is compressed between the top retainer 332 and the annular wall 232 so that the support frame assembly 214 is urged downwardly toward the base frame 216.

When the motor 336 is operated to pivot the support frame assembly 214, the worm 344 will, in effect, "walk" around the detent plate gear 342, thereby pivoting the housing assembly 302 and the support frame assembly 214 around the pivot post 262. The detent plate 318 will be prevented from rotating, thereby maintaining the detent plate gear 342 in a stationary position, by fixed engagement with the ball bearing race 316.

If the support frame assembly 214 is manually forced toward the front of the vehicle, the housing assembly 302 will be urged into rotation. The engagement of the movable peg 360 with the end wall 394 will thus urge the detent plate 318 into rotation. With sufficient manual force, the ball seats 408 will be forced out of engagement with the balls 374, and the balls 374 will travel along the channelway 410. As the ball seats 408 move out of engagement with the balls 374, the detent plate 318 will be translated axially away from the ball bearing race 316, thereby reducing the friction between the detent plate 318 and the ball bearing race 316, and facilitating the movement of the support frame assembly 214 relative to the base assembly 216. Removal of the manual force will leave the ball bearing race 316 and detent plate 318 in a relative position in which the ball seats 408 remain out of engagement with the balls 374. When the motor 336 is again activated, the worm 344 will again attempt to walk around the detent plate gear 342. However, the detent plate 318 will not be prevented from rotating until the balls 374 are again seated in the ball seats 408. When this occurs, the housing assembly 302 will rotate relative to the detent plate 318. The movable peg 360 will move counterclockwise along the detent plate 318, moving up a ramp 392 away from the end wall 394, and then dropping into an adjacent ramp 392, to repeat the movement until the motor 336 is deactivated.

In addition, one the support frame assembly 214 is manually forced into pivotal movement, the movement of the detent plate 318 due to the engagement of the movable peg 360 with the end wall 394 will cause the rotation of the detent plate gear 342, thereby eliminating rotation of the detent plate gear 342 with respect to the worm 344. Thus, the transmission assembly 340 and motor 336 will move as a unit, thereby eliminating stress caused by forced movement that could damage the transmission assembly 340 and or the motor 336. However, if the manual movement of the frame assembly 214 is in an opposite direction, toward the rear of the vehicle, the detent plate 318 will not move because the movable peg 360 will not engage an end wall 394 to thereby force the movement of the detent plate 318. Thus, the worm 344 will attempt to walk around the detent plate gear 342 against the resisting force of the motor 336 and the other gears. The clutch assembly 358 will enable the worm 344 to rotate freely independent of the drive gear 346, thereby eliminating damaging forces to the transmission assembly 340 and the motor 336.

FIGS. 31-40 illustrate a third embodiment of a vehicle mirror system 510 according to the invention, which shares several of the elements of the first two embodiments, and wherein like elements are identified with like numerals. The vehicle mirror system 510 comprises an integrated reduced-friction pivot assembly and controlled rise detent system 530 as hereinafter described.

Figure 31:
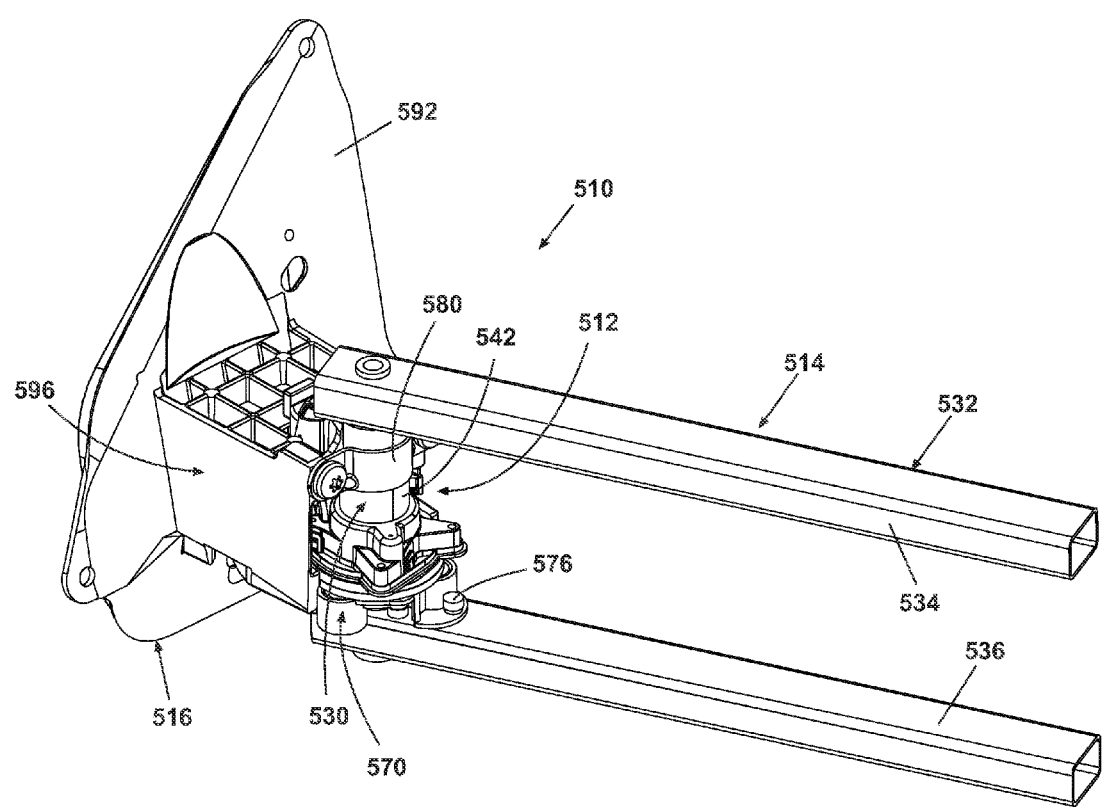
FIG. 31 is a first perspective view of a third embodiment of a vehicle rearview mirror system according to the invention, with portions removed for clarity.
Figure 32:
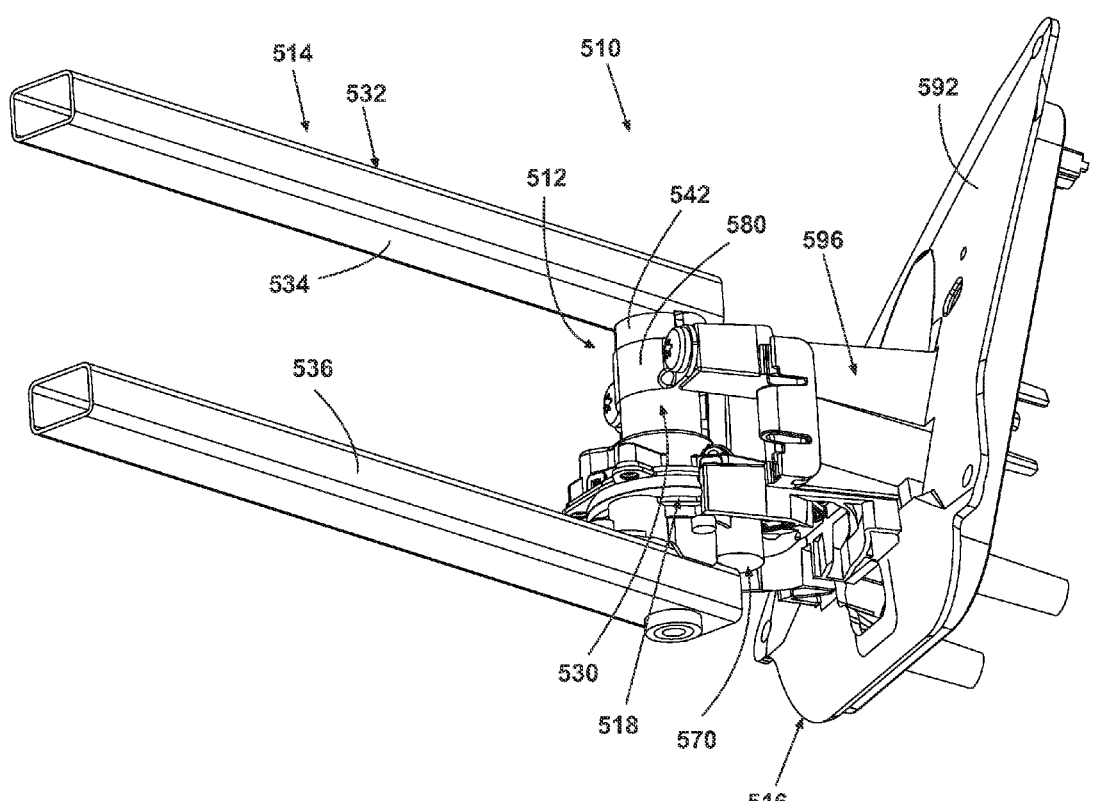
FIG. 32 is a second perspective view of the vehicle rearview mirror system illustrated in FIG. 31.
Figure 33:
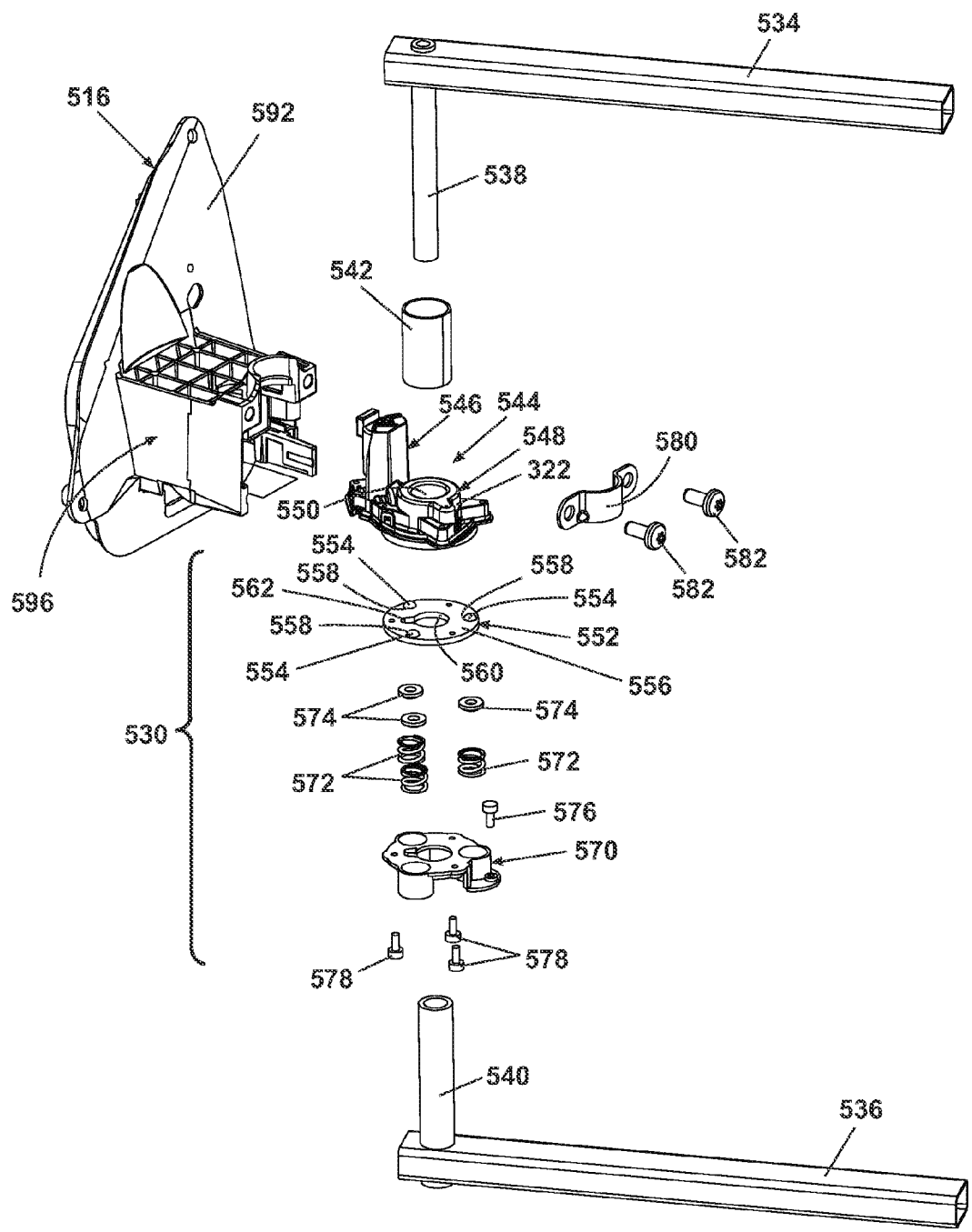
FIG. 33 is an exploded view of the vehicle rearview mirror system illustrated in FIG. 31.

Referring now to FIGS. 31 and 32, the vehicle mirror system 510 is illustrated with the base assembly shell and the reflective element assembly shells removed for clarity. The vehicle mirror system 510 comprises a pivot connection 512 pivotally coupling a support frame assembly 514 with a base frame 516 adapted for attachment to the exterior of a motor vehicle. The support frame assembly 514 comprises a dual arm tube assembly 532 in cooperative registry with the reduced friction pivot assembly/controlled rise detent system 530 (hereinafter referred to as "the detent system 530"). Referring also to FIG. 33, the tube assembly 532 comprises an upper tube 534 and a lower tube 536 in cooperative disposition for the purposes generally described previously herein with respect to the embodiment illustrated in FIGS. 2-9. The upper tube 534 and the lower tube 536 are illustrated as having a generally rectilinear cross-section. However, tubes having a circular, elliptical, or other suitable cross-section can also be utilized.

The mirror system 510 also comprises a power fold assembly 544 having a transmission assembly 546 and a drive motor assembly 548, generally as previously described herein for pivoting the tube assembly 532 relative to the base frame 516 about a pivot axis defined by the longitudinal axis of the assembled upper and lower pivot shafts 538, 540. The power fold assembly 544 is provided with a shaft aperture 550 extending therethrough as previously described. A pivot shaft sleeve 542 is an elongated, annular body adapted for cooperative disposition with the shaft aperture 550. The pivot shaft sleeve 542 enables the tube assembly 532 to pivot relative to the pivot shaft sleeve 542 and is preferably fabricated of a low friction material.

An upper pivot shaft 538 is rigidly attached orthogonally to the upper tube 534 at a proximal end thereof. A lower pivot shaft 540 is rigidly attached orthogonally to the lower tube 536 at a proximal end thereof. The shafts 538, 540 are adapted for telescopic disposition so that, for example, the upper pivot shaft 538 can be slidably inserted into the lower pivot shaft 540 to facilitate assembly of the tube assembly 532 and the detent system 530. The lower pivot shaft 540 is also adapted for slidable registry with the pivot shaft sleeve 542 to enable unimpeded, low-friction rotation of the shaft 540 within the pivot shaft sleeve 542.

The detent system 530 comprises a bearing seat plate 552, a plurality of ball bearings 554, a bearing retainer 570, a plurality of ball springs 572, and a plurality of bearing plates 574 adapted for cooperative disposition with the previously described detent plate 318.

Figure 34:
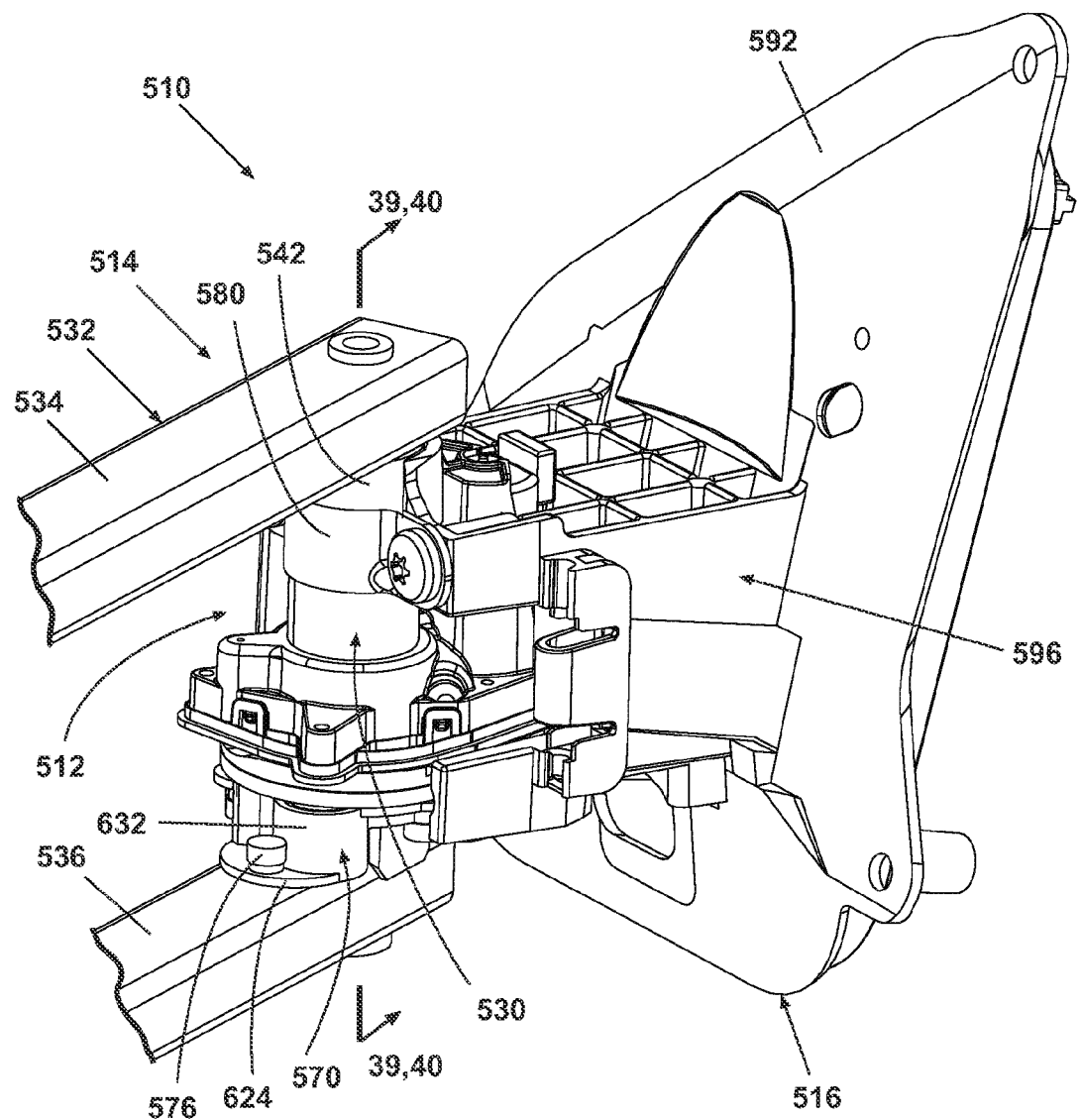
FIG. 34 is an enlarged perspective view of a portion of the vehicle rearview mirror system illustrated in FIG. 31 showing a low rise pivot system.
Figure 35:
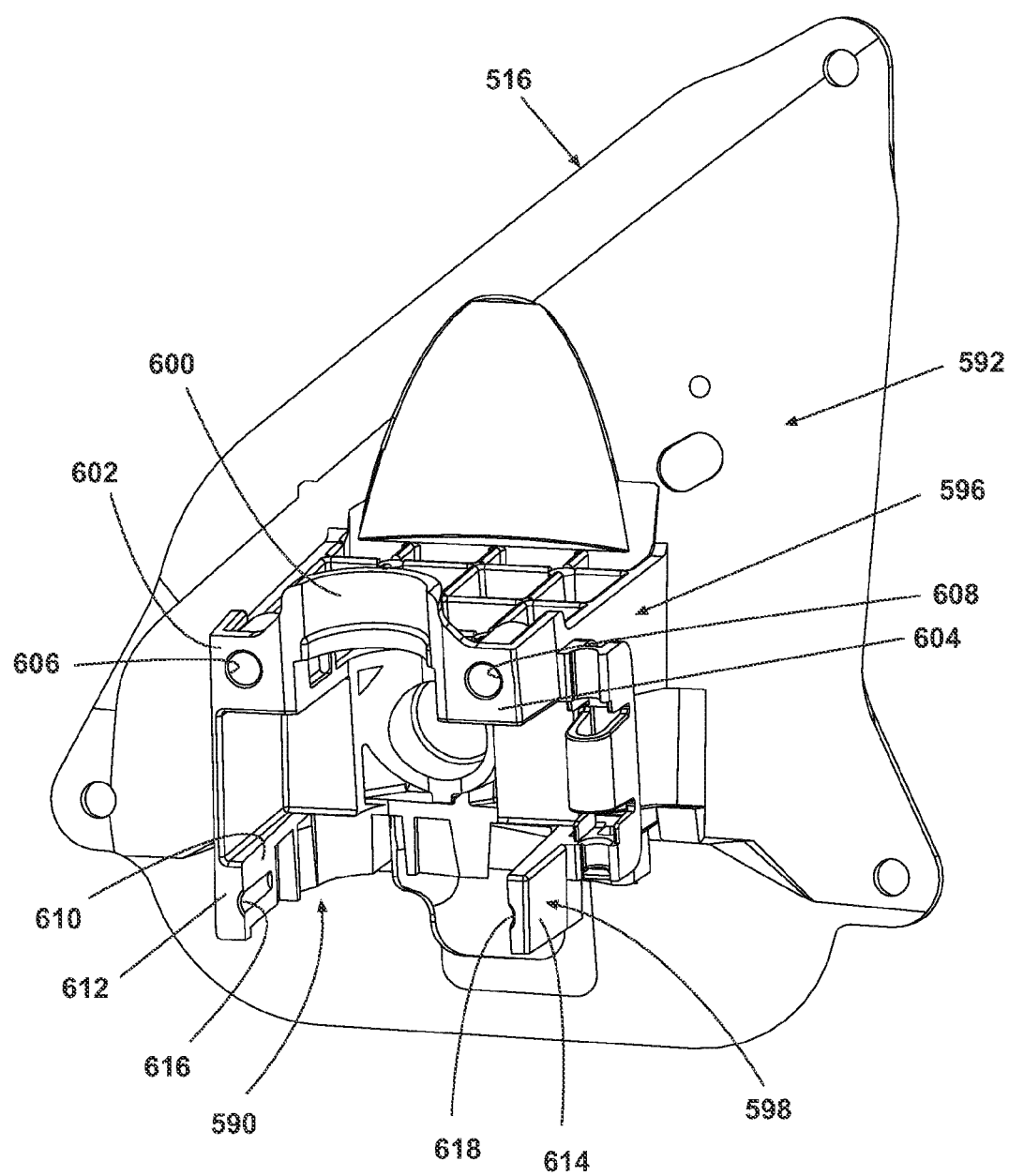
FIG. 35 is an enlarged perspective view of a support pedestal comprising a portion of the vehicle rearview mirror system illustrated in FIG. 31.

Referring also to FIGS. 34 and 35, the base frame 516 is adapted to fixedly hold the detent system 530 and the dual arm tube assembly 532, as hereinafter described. Referring specifically to FIG. 35, the base frame 516 comprises a support pedestal 590 extending generally orthogonally away from a mounting plate 592. The support pedestal 590 is a generally irregularly-shaped body having an upper yoke 596 in spaced disposition from a lower yoke 598. The upper yoke 596 comprises a curved wall 600 terminating in a pair of bosses 602, 604. The bosses 602, 604 are provided with apertures 606, 608 extending longitudinally therein and adapted for receipt of a threaded fastener, such as a screw. The lower yoke 598 comprises a pair of bosses 612, 614 in spaced disposition to define an opening therebetween. The bosses 612, 614 are provided with inwardly-facing slots 616, 618, respectively.

Figure 36:
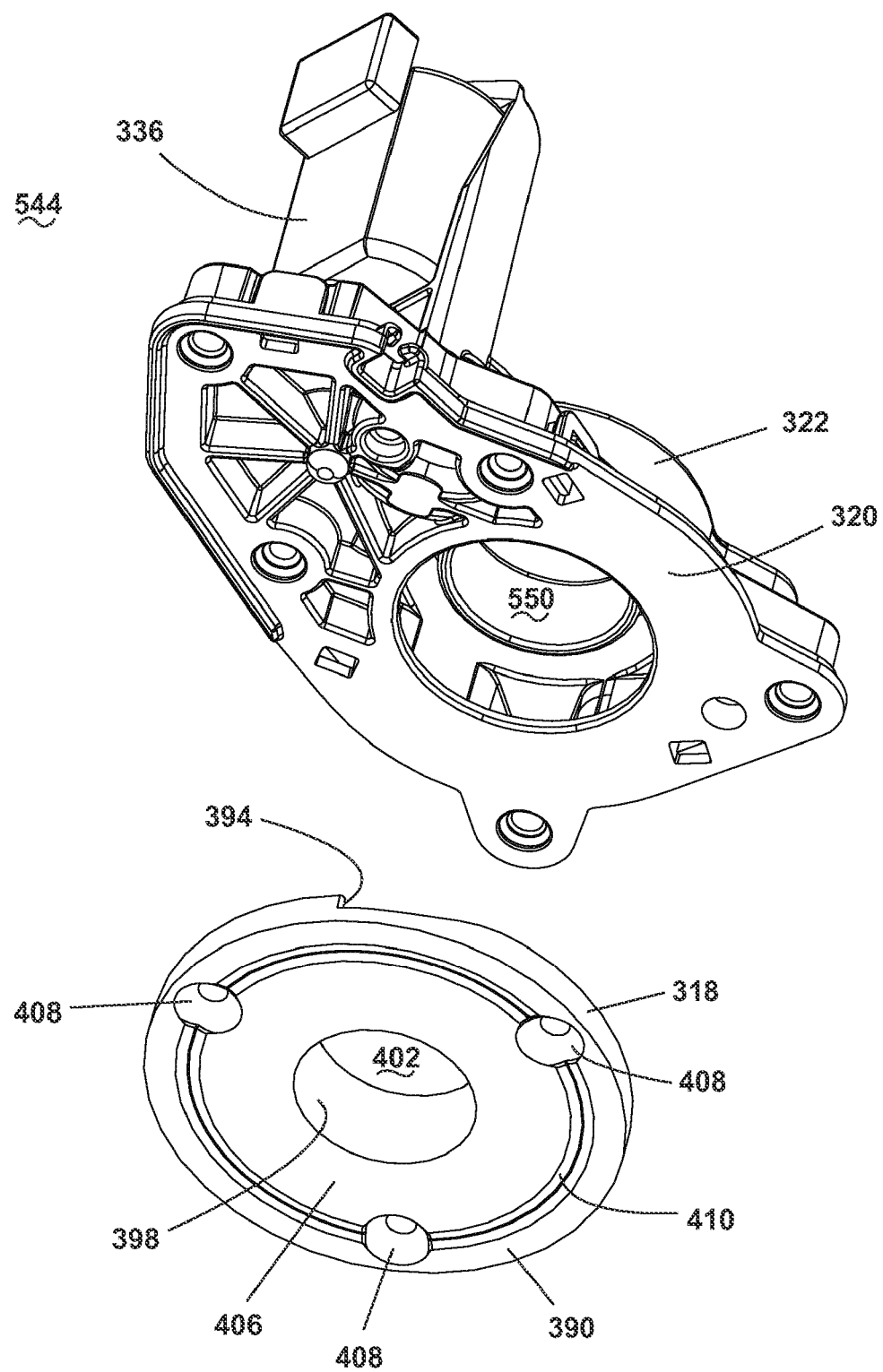
FIG. 36 is a partially exploded view of a powerfold assembly comprising a portion of the vehicle rearview mirror system illustrated in FIG. 31.

Referring to FIG. 36, the powerful assembly 544 comprises the previously described lower housing piece 320, upper housing piece 322, motor 336, and transmission assembly (not shown). The detent plate 318 is adapted for cooperative registration with the transmission assembly for rotation of the detent plate 318 as previously described.

Figure 37:
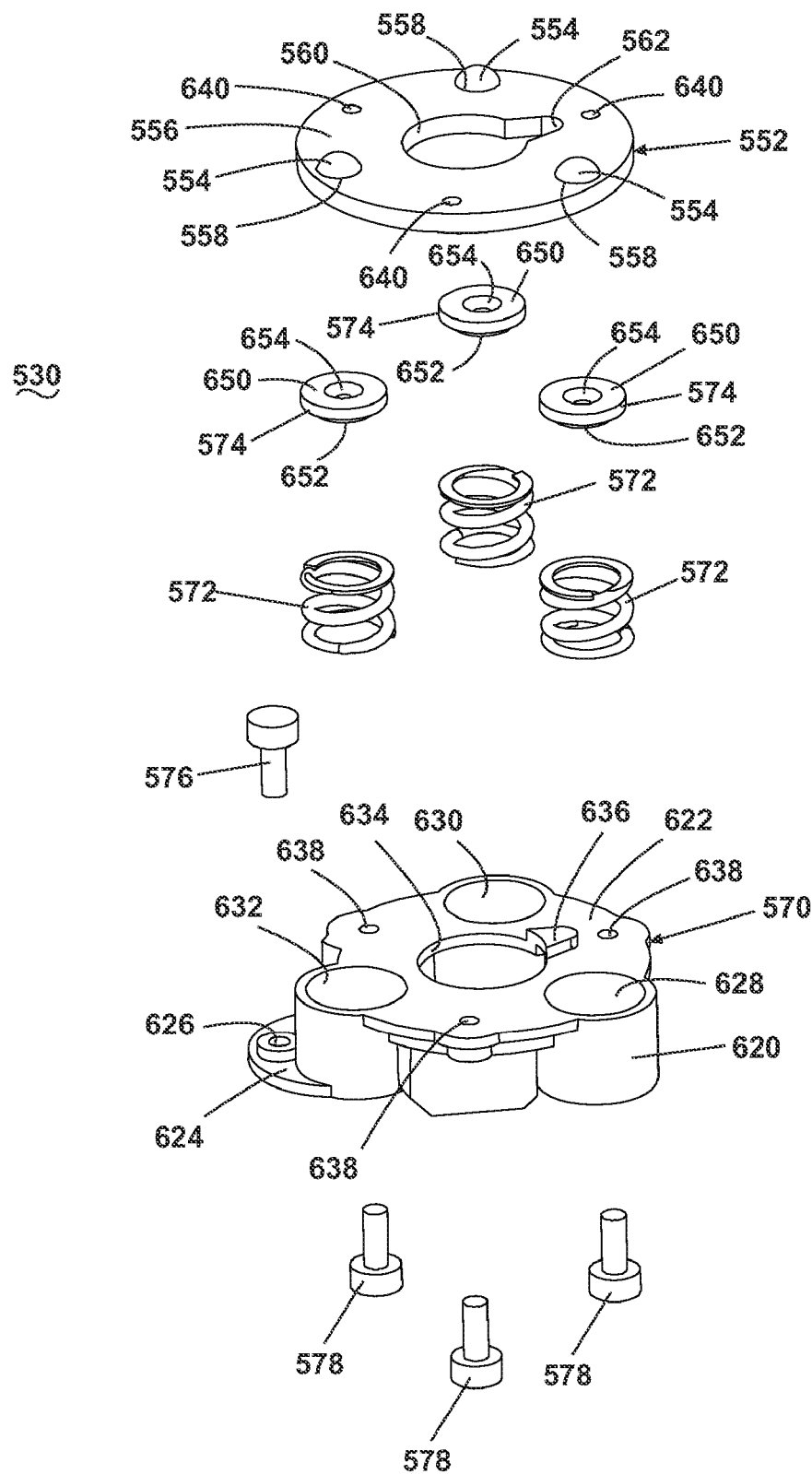
FIG. 37 is an exploded view of a controlled rise detent system comprising a portion of the vehicle rearview mirror system illustrated in FIG. 31.
Figure 38:
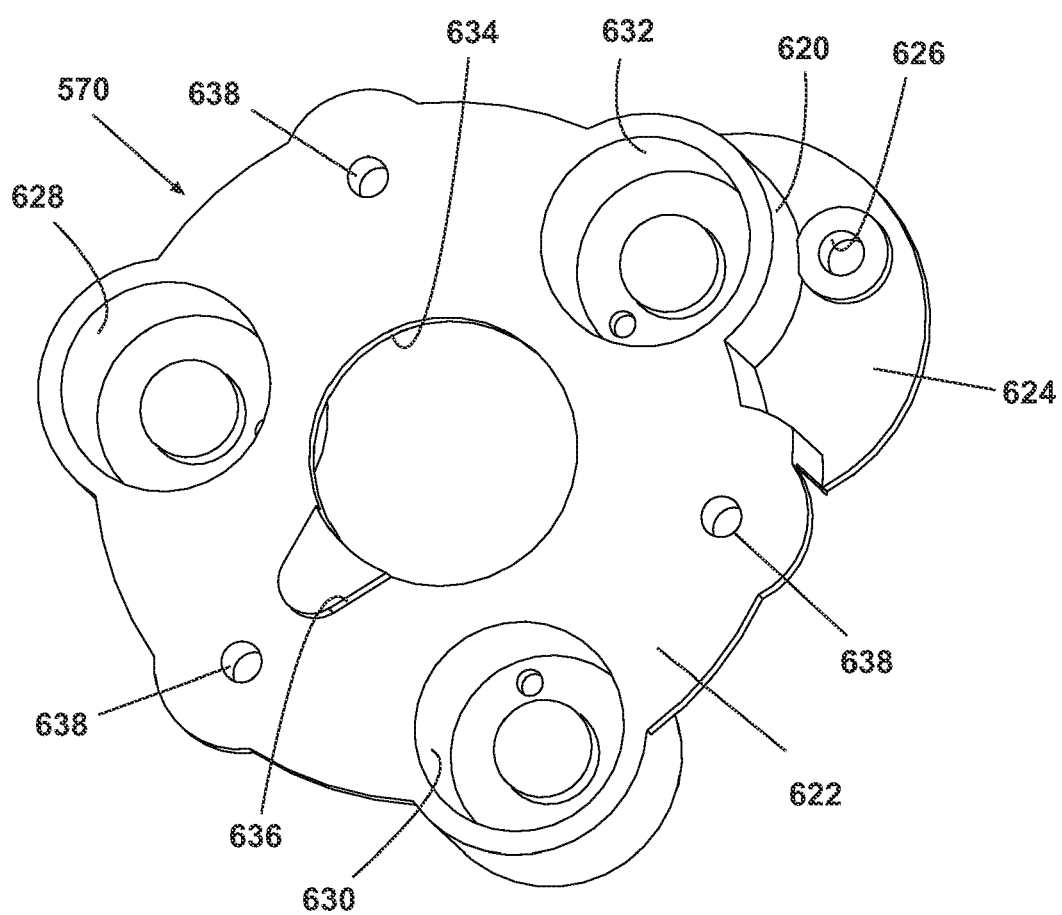
FIG. 38 is an enlarged perspective view of a bearing retainer comprising a portion of the vehicle rearview mirror system illustrated in FIG. 31.

As illustrated in FIGS. 37 and 38, the bearing seat plate 552 is a circular, disc-like a body comprising an annular flange 556 circumscribing a shaft aperture 560 extending coaxially through the plate 552. The annular flange 556 has a plurality of regularly-spaced circular ball apertures 558 extending therethrough along the outer perimeter of the flange 556, adapted for seating of the ball bearings 554 therein. The ball apertures 558 are adapted to enable rotation of the ball bearings 554 therein and accommodate some vertical movement of the ball bearings 554, as hereinafter described. The shaft aperture 560 transitions to a notch 562 extending radially outwardly therefrom. A plurality of regularly-spaced fastener apertures 640 extend through the annular flange 556, and are adapted for receipt of threaded fasteners therein.

The bearing retainer 570 is a somewhat irregularly-shaped, flattened member comprising a retainer body 620 terminating on one side in a planar wall 622. The retainer body 620 comprises a plurality (preferably three) of annular ball spring housings 628, 630, 632 in regularly-spaced disposition along the outer perimeter of the planar wall 622 and opening therethrough to form cylindrical chambers adapted for coaxial alignment with the ball apertures 558. The wall 622 is provided with a plurality of fastener apertures 638 adapted for coaxial alignment with the fastener apertures 640. The bearing retainer 570 is also provided with a shaft aperture 634 extending therethrough and adapted for coaxial alignment with the shaft aperture 560. Extending orthogonally away from the wall 622 and radially away from the shaft aperture 634 is in alignment boss 636 adapted for slidable registry with the notch of 562. Extending laterally away from the ball spring housings 632 opposite the planar wall 622 is a flange 624 having an aperture 626 extending therethrough.

The housings 628, 630, 632, are adapted for receipt therein of biasing members, preferably helical springs 572, and bearing plates 574. The bearing plates 574 are somewhat circular T-shaped bodies comprising a circular disc-like ball plate 650 terminating at a first side in a cylindrical coaxially-aligned pedestal 652, and that a second side in a coaxially-aligned concave seat 654. The pedestal 652 is adapted for slidable registry with the interior of a helical spring 572. The ball plate 650 is adapted for slidable retention in the ball spring housing 628, 630, 632 so that a vertical force applied to the ball plate 650 will compress the spring 572 in the ball spring housing 628, 630, 632 and urge the ball plate 650 longitudinally into the housing 628, 630, 632.

The detent system 530 is assembled by inserting the springs 572 and the bearing plates 574 into the housings 628, 630, 632 and attaching the bearing seat plate 552 to the planar wall 622 by fasteners 578 inserted through the fastener apertures 638 and threaded into the fastener apertures 640. As so assembled, the ball bearings 554 will be held in the ball apertures 558 and seated in the seats 654. The ball bearings 554 can move within the ball apertures 558 against the biasing force of the springs 572 under the influence of a force applied to the ball bearings 554. Removal of the force will result in the ball bearings 554 being returned to an at rest position in the bearing seat plate 552.

The mirror system 510 is assembled by attaching the powerful assembly 544 to the support pedestal 590 of the base frame 516. The lower housing piece 320 can be provided with a pair of ears (not shown) adapted for slidable seating in the slots 616, 618, of the lower yoke 598. The lower pivot shaft 540 can be inserted through the detent system 530, the shaft aperture 550 in the powerful assembly 544, and the pivot shaft sleeve 542, to be coupled with the upper pivot shaft 538. The entire assembly can then be attached to the upper yoke 596 by securing the pivot shaft sleeve 542 to the upper yoke 596 by a strap 580 attached to the bosses 602, 604 by fasteners 582 inserted through the strap 580 into the aperture 606, 608. The lower tube 536 is attached to the bearing retainer 570 by a threaded fastener passing through the aperture 626 in the flange 624 and into a suitable threaded aperture (not shown) in the lower tube 536.

Figure 39:
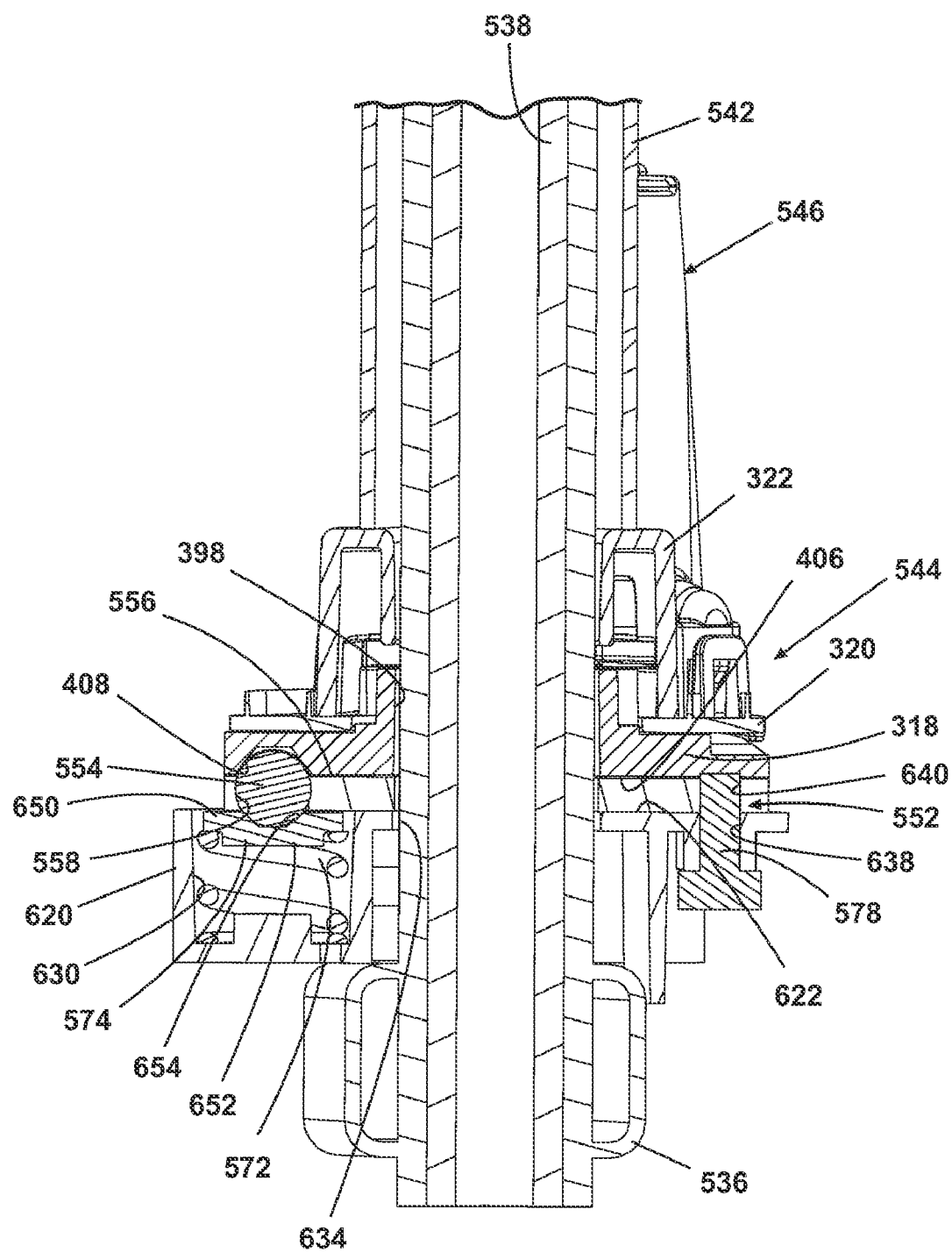
FIG. 39 is a sectional view taken along view line 39-39 of FIG. 34.

As illustrated in FIG. 39, with the detent system 530 in an at rest position, e.g. the reflective element assembly in a fully unfolded configuration, the ball bearings 554 are located in the ball seats 408 of the detent plate 318 under the influence of the springs 572. Activation of the powerful assembly 544 will urge the rotation of the detent plate 318. Because of the coupling of the ball bearings 554 with the detent plate 318, the bearing seat plate 552 will be urged into rotation, along with the retainer body 620. Because the retainer body 620 is fixedly attached to the lower tube 536, the support frame assembly 514 will be urged into rotation. The detent plate 318 and the bearing seat plate 552 can be fabricated of a low friction material to facilitate slidable movement of the plates 318, 552 relative to each other.

Figure 40:
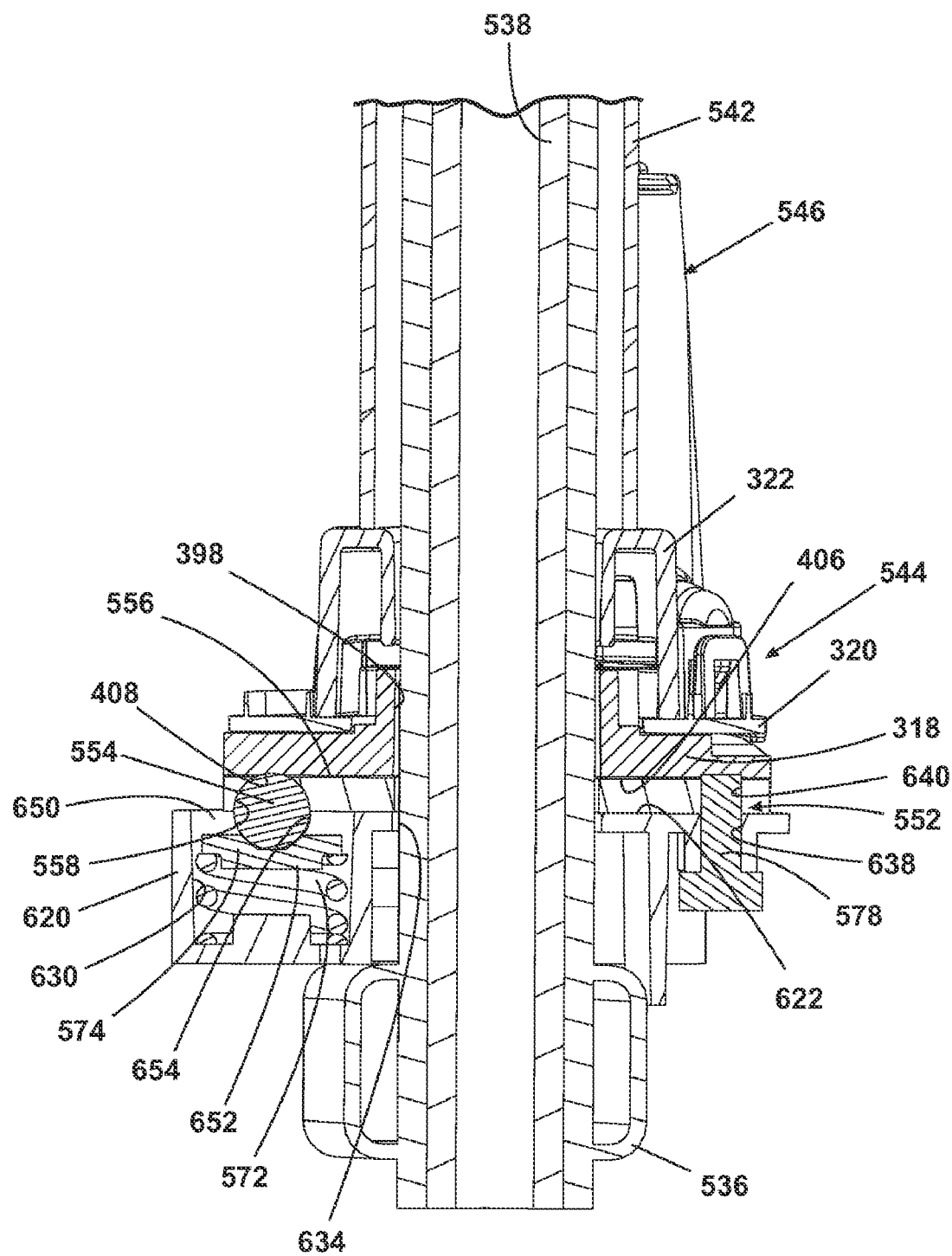
FIG. 40 is a sectional view taken along view line 40-40 of FIG. 34.

Referring to FIG. 40, if the support frame assembly 514 is urged into rotation due to an applied external force, the retainer body 620, the bearing seat plate 552, and the ball bearings 554 will be urged into rotation. If sufficient force is applied to the support frame assembly 514, the ball bearings 554 will be urged out of the ball seats 408 of the detent plate 318. This will only be accomplished by deflection of the ball bearings 554 away from the detent plate 318 against the force of the springs 572. Upon exiting the ball seats 408, the ball bearings 554 can travel along the channelway 410 in the detent plate 318. Because the ball bearings 554 deflect away from the detent plate 318, the spacing between the detent plate 318 and the bearing seat plate 552 is not increased. Thus, the upper tube 534 does not rise relative to the lower tube 536, and vice versa. Furthermore, the pivot shafts 538, 540 do not move relative to the powerful assembly 544.

The reduced friction pivot assembly described herein provides a simple and effective device for use with a powerfold or manually foldable vehicle mirror system. The spring-biased ball bearing and ball seat configuration provides positive coupling of the powerfold assembly to the pivoting support frame assembly 24 during normal operating conditions. During manual operation, or with a manually foldable vehicle mirror system, the ball bearing and ball seat configuration provides a nearly frictionless pivot assembly to facilitate movement of the vehicle mirror system between the folded and unfolded positions and between an "in detent" and an "out of detent" position. With a non-ball bearing or high friction configuration wherein two plates must rotate relative to each other, the motor must be sized to accommodate the increased torque required in order to move the two plates while the motor is "searching" for the in detent position. This increases the cost of the motor and its power consumption. The ball bearing assembly also eliminates the parts wear present in conventional pivot assemblies utilizing slidably engaging pivot elements, thereby contributing to longer pivot assembly life, and less mirror vibration due to worn and improperly fitting components. Moreover, the configuration of the detent assembly to enable manual folding of the mirror system without the vertical deflection that can necessitate enclosures having a larger profile, and result in increased component wear and vibration.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A mirror assembly for use on a motor vehicle comprising:
   a reflective element assembly for providing an external rearward reflective view to an operator of the motor vehicle;
   a base adapted to be mounted to the vehicle;
   a support arm assembly having a first end and a second end, the first end being movably attached to the base between a folded position and an unfolded position, the second end being mounted to the reflective element assembly; and
   a reduced-friction detent assembly interposed between the first end of the support arm assembly and the base, the reduced-friction detent assembly comprising:
      at least one bearing selectively mounted in one of an engaged position and a disengaged position;
      a first plate rotatably coupled to the base and having at least one bearing seat;
      a second plate comprising at least one ball aperture and coupled to the first plate for unitary movement therewith in the engaged position;
      a retainer coupled to the second plate comprising at least one housing aligned with the at least one ball aperture; and
      at least one bearing set plate received in the at least one housing and resiliently biased toward the second plate;
   wherein the support arm assembly moves between the folded and unfolded positions in the disengaged position with less friction than when the at least one bearing is in the engaged position.

2. The mirror assembly of claim 1 wherein the at least one bearing is seated within a corresponding one of the at least one ball aperture and in contact with the first plate and the at least one bearing plate.

3. The mirror assembly of claim 2 and further comprising at least one spring received in the at least one housing for biasing the at least one bearing plate toward the second plate.

4. The mirror assembly of claim 3 wherein the second plate and the retainer rotate with the rotation of the first plate when the at least one bearing is seated within a corresponding one of the at least one ball aperture and in contact with the at least one bearing seat and the at least one bearing plate.

5. The mirror assembly of claim 3 wherein the second plate and the retainer rotate relative to the first plate when the at least one bearing is moved from the engaged position in the at least one bearing seat to the disengaged position in contact with the first plate and the at least one bearing plate, and a spacing between the first plate and the second plate does not vary between the engaged position and the disengaged position.

6. A mirror assembly for use on a motor vehicle comprising:
   a reflective element assembly for providing an external rearward reflective view to an operator of the motor vehicle;
   a base adapted to be mounted to the vehicle;
   a support arm assembly having a first end and a second end, the first end being movably attached to the base between a folded position and an unfolded position, the second end being mounted to the reflective element assembly; and
   a reduced-friction detent assembly interposed in a fixed spacing between the first end of the support arm assembly and the base, the reduced-friction detent assembly comprising:
      at least one bearing selectively mounted in one of an engaged position and a disengaged position;
      a first plate rotatably coupled to the base and having at least one bearing seat;
      a second plate comprising at least one ball aperture and coupled to the first plate for unitary movement therewith in the engaged position;
      a retainer coupled to the second plate comprising at least one housing aligned with the at least one ball aperture;
      and at least one bearing set plate received in the at least one housing and resiliently biased toward the second plate;
   wherein movement of the support arm assembly between the folded and unfolded positions moves the at least one bearing between the engaged position and the disengaged position without varying the spacing between the first end of the support arm assembly and the base.

7. The mirror assembly of claim 6 wherein the at least one bearing is seated within a corresponding one of the at least one ball aperture and in contact with the first plate and the at least one bearing plate.

8. The mirror assembly of claim 7 and further comprising at least one spring received in the at least one housing for biasing the at least one bearing plate toward the second plate.

9. The mirror assembly of claim 8 wherein the second plate and the retainer rotate with the rotation of the first plate when the at least one bearing is seated within a corresponding one of the at least one ball aperture and in contact with the at least one bearing seat and the at least one bearing plate.

10. The mirror assembly of claim 8 wherein the second plate and the retainer rotate relative to the first plate when the at least one bearing is moved from the engaged position in the at least one bearing seat to the disengaged position in contact with the first plate and the at least one bearing plate, and a spacing between the first plate and the second plate does not vary between the engaged position and the disengaged position.

* * * * *